(12) United States Patent
Matsui et al.

(10) Patent No.: US 11,405,573 B2
(45) Date of Patent: Aug. 2, 2022

(54) LIGHT DETECTION DEVICE AND LIGHT DETECTION METHOD

(71) Applicant: HAMAMATSU PHOTONICS K.K., Hamamatsu (JP)

(72) Inventors: Yoshinori Matsui, Hamamatsu (JP); Munenori Takumi, Hamamatsu (JP); Haruyoshi Toyoda, Hamamatsu (JP); Kazutaka Suzuki, Hamamatsu (JP); Kazuhiro Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 21 days.

(21) Appl. No.: 16/976,570

(22) PCT Filed: Dec. 25, 2018

(86) PCT No.: PCT/JP2018/047627
§ 371 (c)(1),
(2) Date: Aug. 28, 2020

(87) PCT Pub. No.: WO2019/171717
PCT Pub. Date: Sep. 12, 2019

(65) Prior Publication Data
US 2021/0006738 A1    Jan. 7, 2021

(30) Foreign Application Priority Data
Mar. 8, 2018    (JP) .............................. JP2018-041779

(51) Int. Cl.
*H04N 5/376*    (2011.01)
*H04N 5/345*    (2011.01)
(Continued)

(52) U.S. Cl.
CPC ............. *H04N 5/376* (2013.01); *H04N 5/347* (2013.01); *H04N 5/3454* (2013.01); *H04N 5/378* (2013.01); *H04N 5/3742* (2013.01)

(58) Field of Classification Search
CPC .... H04N 5/3454; H04N 5/347; H04N 5/3742; H04N 5/376; H04N 5/378
See application file for complete search history.

(56) References Cited

U.S. PATENT DOCUMENTS

| 5,949,483 | A  | * | 9/1999  | Fossum   | ............... | H04N 5/3575 348/303 |
| 6,972,791 | B1 | * | 12/2005 | Yomeyama | .......... | H04N 5/3454 348/230.1 |
| 7,193,197 | B2 | * | 3/2007  | Sugiyama | ............ | H04N 3/1506 250/208.1 |
| 8,735,795 | B2 | * | 5/2014  | Qiao     | ...................... | H04N 5/378 250/208.1 |

(Continued)

FOREIGN PATENT DOCUMENTS

| CN | 1586008 A  | 2/2005 |
| EP | 1753225 A1 | 2/2007 |

(Continued)

OTHER PUBLICATIONS

International Preliminary Report on Pantentability dated Sep. 17, 2020 for PCT/JP2018/047627.

*Primary Examiner* — Lin Ye
*Assistant Examiner* — Chriss S Yoder, III
(74) *Attorney, Agent, or Firm* — Faegre Drinker Biddle & Reath LLP

(57) ABSTRACT

A light detection device detects an incident position of light. The plurality of pixels are arranged two-dimensionally in a matrix and individually have a first photosensitive portion and a second photosensitive portion. The first circuit connects a plurality of first photosensitive portions to each other (Continued)

for every row. The second circuit connects a plurality of second photosensitive portions to each other for every column. The first reading unit reads signal data through the first circuit. The second reading unit reads signal data through the second circuit. The first circuit includes row switches arranged to switch electrical connection and disconnection between first photosensitive portions adjacent to each other in the same row.

11 Claims, 16 Drawing Sheets

(51) Int. Cl.
*H04N 5/347* (2011.01)
*H04N 5/378* (2011.01)
*H04N 5/374* (2011.01)

(56) References Cited

U.S. PATENT DOCUMENTS

| 2005/0128328 | A1 | 6/2005 | Kakumoto et al. |
| 2008/0253616 | A1* | 10/2008 | Mizuno ............... H04N 5/3454 382/105 |
| 2014/0022427 | A1* | 1/2014 | Goto ................... H04N 5/347 348/296 |
| 2015/0189249 | A1* | 7/2015 | Hiyama ............... H04N 5/378 348/281 |

FOREIGN PATENT DOCUMENTS

| JP | 2005-176081 A | 6/2005 |
| JP | 2005-323190 A | 11/2005 |
| JP | 2009-033316 A | 2/2009 |
| JP | 4351057 B2 | 10/2009 |
| WO | WO-03/049190 A1 | 6/2003 |

* cited by examiner

LIGHT DETECTION DEVICE AND LIGHT DETECTION METHOD

TECHNICAL FIELD

The present invention relates to a light detection device and a light detection method.

BACKGROUND ART

Known light detection devices include a plurality of pixels (Patent Literature 1). The plurality of pixels are arranged two-dimensionally in a matrix. Each of the plurality of pixels has a pair of photosensitive portions. One of each of the pairs of photosensitive portions for every row is connected to each other through a first circuit. The other of each of the pairs of photosensitive portions for every column is connected to each other through a second circuit. Signal data projected in the row direction is read from the first circuit. Signal data projected in the column direction is read from the second circuit.

CITATION LIST

Patent Literature

[Patent Literature 1] PCT International Publication No. WO2003/049190

SUMMARY OF INVENTION

Technical Problem

In the known light detection device described above, one pixel in a sensor light receiving unit is divided into two parts. One of each of the parts of the pixels for every row is connected to each other, and the other of each of the parts of the pixels for every column is connected to each other. A light spot incident on the sensor light receiving unit is projected as signal data in each of a row direction and a column direction, and the signal data is read in each of the row direction and the column direction. An output data amount in a structure having this light receiving unit is similar to that in the case in which two one-dimensional sensors having a plurality of pixels are combined and is smaller than the output data amount of a general two-dimensional sensor. Therefore, in the light detection device, compared to a general two-dimensional sensor, a two-dimensional position of a light spot incident on the sensor light receiving unit can be detected quickly.

In the light detection device described above, when a plurality of spots of light are incident on the sensor light receiving unit, signal data of the plurality of spots of light is summed and projected in each of the row direction and the column direction. In this case, it is difficult to accurately distinguish the signal data of the plurality of spots of light from each other based on the signal data output from the light detection device. For this reason, in the light detection device, there is concern that an incident position of each of a plurality of spots of light may not be able to be identified accurately.

Objects of a first aspect and a second aspect of the present invention are to provide a light detection device in which incident positions of a plurality of spots of light can be detected accurately while detection speed is ensured. An object of a third aspect of the present invention is to provide a light detection method in which incident positions of a plurality of spots of light can be detected accurately while detection speed is ensured.

Solution to Problem

According to a first aspect of the present invention, there is provided a light detection device detecting an incident position of light. This light detection device includes a plurality of pixels, a first circuit, a second circuit, a first reading unit, and a second reading unit. The plurality of pixels are arranged two-dimensionally in a matrix and individually have a first photosensitive portion and a second photosensitive portion. The first circuit connects a plurality of the first photosensitive portions to each other for every row. The second circuit connects a plurality of the second photosensitive portions to each other for every column. The first reading unit is arranged to read signal data through the first circuit. The second reading unit is arranged to read signal data through the second circuit. In each row, the first circuit includes row switches arranged to switch electrical connection and disconnection between first photosensitive portions adjacent to each other in the same row.

In this first aspect, the row switches switch electrical connection and disconnection between first photosensitive portions adjacent to each other in the same row. For this reason, a first photosensitive portion for outputting a signal to the first reading unit can be selected from the plurality of first photosensitive portions arranged in the same row. According to this, in the light detection device, for example, even when a plurality of spots of light are incident, signals generated due to the incidence of different spots of light can be prevented from being summed in the same row by cutting off electrical connection of the row switches. Therefore, with signal data output from the light detection device, while speed of detecting the plurality of spots of light is ensured, each of the incident positions of the plurality of spots of light can be detected accurately.

In this first aspect, in each column, the second circuit may include column switches arranged to switch electrical connection and disconnection between second photosensitive portions adjacent to each other in the same column. In this case, a second photosensitive portion for outputting a signal to the second reading unit can be selected from the plurality of second photosensitive portions arranged in the same column. According to this, in the light detection device, for example, even when a plurality of spots of light are incident, signals generated due to the incidence of different spots of light can be prevented from being summed in the same column by cutting off electrical connection of the column switches. Therefore, with signal data output from the light detection device, while speed of detecting the plurality of spots of light is ensured, each of the incident positions of the plurality of spots of light can be detected accurately.

In this first aspect, the light detection device may further include a switch control unit arranged to control turning ON/OFF of the row switches based on signal data read by at least one of the first reading unit or the second reading unit. In this case, a first photosensitive portion for outputting a signal to the first reading unit through the first circuit can be selected from the plurality of first photosensitive portions arranged in the same row based on the read signal data. For example, if a first photosensitive portion for outputting a signal to the first reading unit is selected based on the incident positions of spots of light detected in a preceding frame, incident positions of a plurality of spots of light can be detected more accurately.

In this first aspect, the first circuit may include a plurality of output ports for individually outputting signal data from a plurality of the first photosensitive portions arranged in the same row. The first reading unit may be arranged to read signal data from each of the plurality of output ports. Since signal data is read from the plurality of first photosensitive portions arranged in the same row through a plurality of output ports, reading speed can be improved.

In this first aspect, the first circuit may include a plurality of wirings extending in a row direction and connected to the row switches and the first photosensitive portions. The first reading unit may include a pixel selecting unit arranged to select a pixel group for reading signal data by selecting at least one wiring for reading signal data from the plurality of wirings. In this case, while signals generated due to the incidence of different spots of light are prevented from being summed in the same row, signal data can be read from a first photosensitive portion which is more suitable for detecting an incident position of light.

In this first aspect, the first reading unit may include a skipping selecting unit arranged to select a pixel column to skip from a pixel group selected by the pixel selecting unit. In this case, since the number of pixels for reading signal data is reduced, reading speed can be further improved.

In this first aspect, the first reading unit may include a binning reading unit arranged to read signal data by compiling, into one signal, information of signals output from a plurality of the first photosensitive portions connected to a predetermined number of wirings of the plurality of wirings selected by the pixel selecting unit. In this case, while information of signals output from a plurality of the first photosensitive portions connected to a plurality of wirings is reflected, reading speed can be further improved compared with when a plurality of signals output from a plurality of first photosensitive portions are read as signal data without any change.

According to a second aspect of the present invention, there is provided a light detection device detecting incident positions of a plurality of spots of light. The light detection device includes a plurality of pixels, a first circuit, a second circuit, a first reading unit, a second reading unit, and a dividing unit. The plurality of pixels are arranged two-dimensionally in a matrix and individually have a first photosensitive portion and a second photosensitive portion. The first circuit connects a plurality of the first photosensitive portions to each other for every row. The second circuit connects a plurality of the second photosensitive portions to each other for every column. The first reading unit is arranged to read signal data through the first circuit. The second reading unit is arranged to read signal data through the second circuit. The dividing unit is arranged to divide the plurality of pixels into a plurality of groups corresponding to the incident positions of respective spots of light by partitioning, based on signal data read from at least one of the first reading unit or the second reading unit, regions in which the plurality of pixels are arranged. The first reading unit is arranged to read the signal data for each of the groups divided off by the dividing unit.

In this second aspect, the dividing unit is arranged to divide the plurality of pixels into a plurality of groups by partitioning regions in which the plurality of pixels are arranged for each of the detected incident positions of the respective spots of light. The first reading unit reads the signal data for each of the groups divided off by the dividing unit. In this case, even if pixels arranged in the same row are irradiated with a plurality of spots of light, signal data is read for each of the groups divided in accordance with the incident positions of spots of light. Therefore, signal data related to each spot of light is separately read. For this reason, in a configuration in which detection speed is ensured by acquiring projected signal data, the incident positions of the plurality of spots of light can be detected accurately.

In this second aspect, the first reading unit may include a pixel selecting unit arranged to select a pixel group for reading signal data from a plurality of the pixels within each of the groups. In this case, signal data can be read from a pixel group, of the plurality of pixels within each group, suitable for detecting an incident position of light.

In this second aspect, the first reading unit may include a skipping selecting unit arranged to select a pixel column to skip from a pixel group selected by the pixel selecting unit. In this case, since the number of pixels for reading signal data from a pixel group selected by the pixel selecting unit is reduced, reading speed can be further improved.

In this second aspect, the first reading unit may include a binning reading unit arranged to read signal data by compiling, into one signal, information of signals output from a plurality of the first photosensitive portions arranged in a plurality of rows within at least one group. In this case, while information of signals output from a plurality of the first photosensitive portions arranged in a plurality of rows within each group is reflected, reading speed can be further improved compared with when a plurality of signals output from a plurality of first photosensitive portions are read as signal data without any change.

According to a third aspect of the present invention, there is provided a light detection method for detecting a two-dimensional incident position of spot of light using a light detection device. The light detection device is provided with a plurality of pixels, a first circuit, and a second circuit. The plurality of pixels are arranged two-dimensionally in a matrix and individually include a first photosensitive portion and a second photosensitive portion. The first circuit connects a plurality of the first photosensitive portions to each other for every row. The second circuit connects a plurality of the second photosensitive portions to each other for every column. The light detection method includes reading signal data projected in a row direction from signals output through the first circuit, reading signal data projected in a column direction from signals output through the second circuit, and detecting a two-dimensional incident position of spot of light from two pieces of the read signal data. The light detection method includes detecting a two-dimensional incident position of at least one of spots of light based on the signal data, when a plurality of spots of light are detected, dividing the plurality of pixels into a plurality of groups by partitioning, based on a detected two-dimensional incident position of each of the spots of light, regions in which the plurality of pixels are arranged, and reading the signal data for each group.

In this third aspect, the plurality of pixels are divided into a plurality of groups by partitioning regions in which the plurality of pixels are arranged based on the detected two-dimensional incident position of each spot of light when a plurality of spots of light are detected. The signal data is read for each group. In this case, even if pixels arranged in the same row are irradiated with a plurality of spots of light, signal data related to each spot of light is individually read. For this reason, in a configuration in which detection speed is ensured by acquiring projected signal data, the incident positions of the plurality of spots of light can be detected accurately.

Advantageous Effects of Invention

According to the first aspect and the second aspect of the present invention, there is provided a light detection device in which detection speed can be ensured and incident positions of a plurality of spots of light can be detected accurately. According to the third aspect of the present invention, there is provided a light detection method in which detection speed can be ensured and incident positions of a plurality of spots of light can be detected accurately.

DESCRIPTION OF EMBODIMENT

Hereinafter, with reference to the accompanying drawings, an embodiment of the present invention will be described in detail. In the description, the same reference signs are used for the same elements or elements having the same function, and duplicate description will be omitted.

Figure 1:
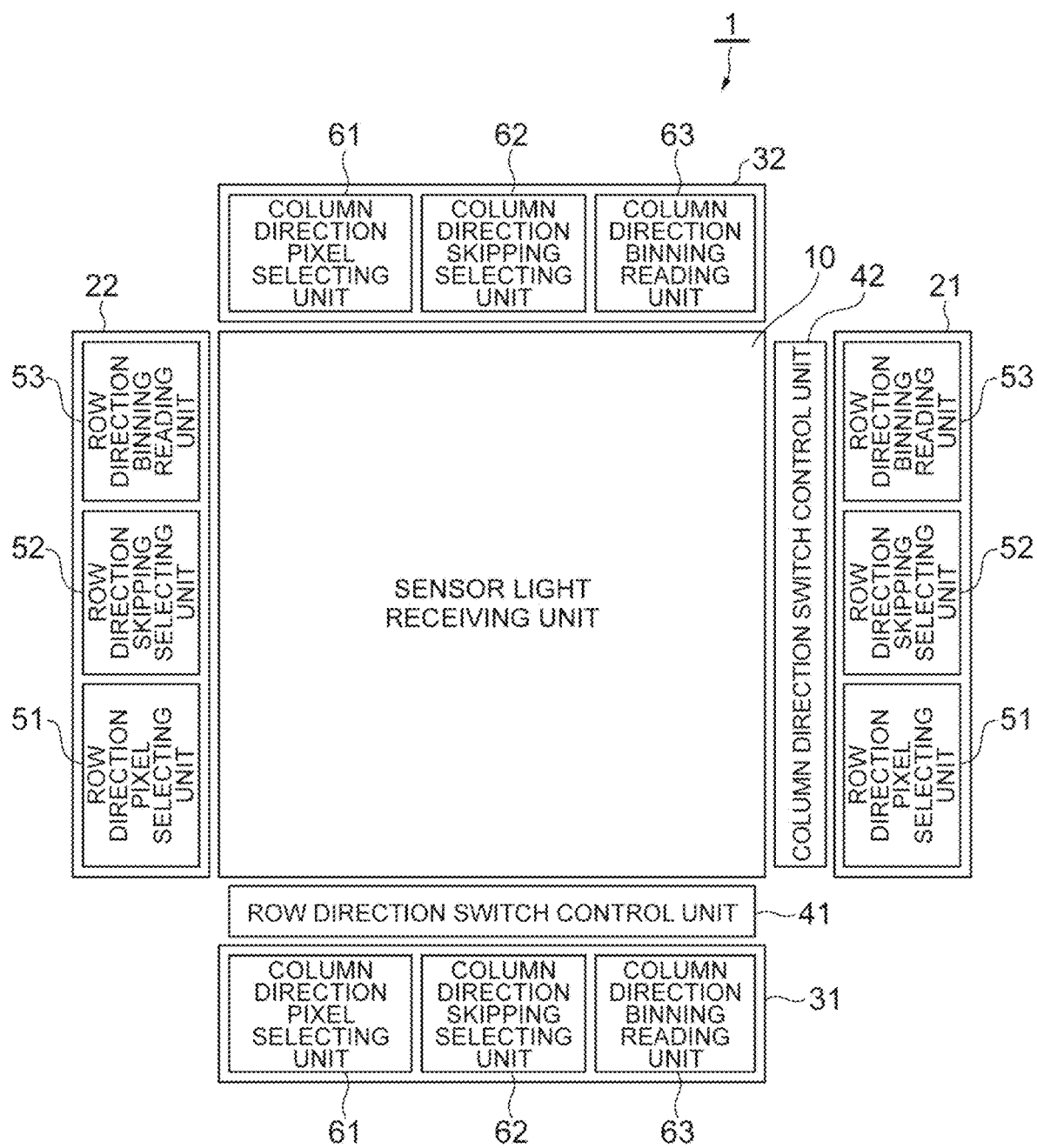
FIG. 1 is a block diagram of a light detection device according to an embodiment.
Figure 2:
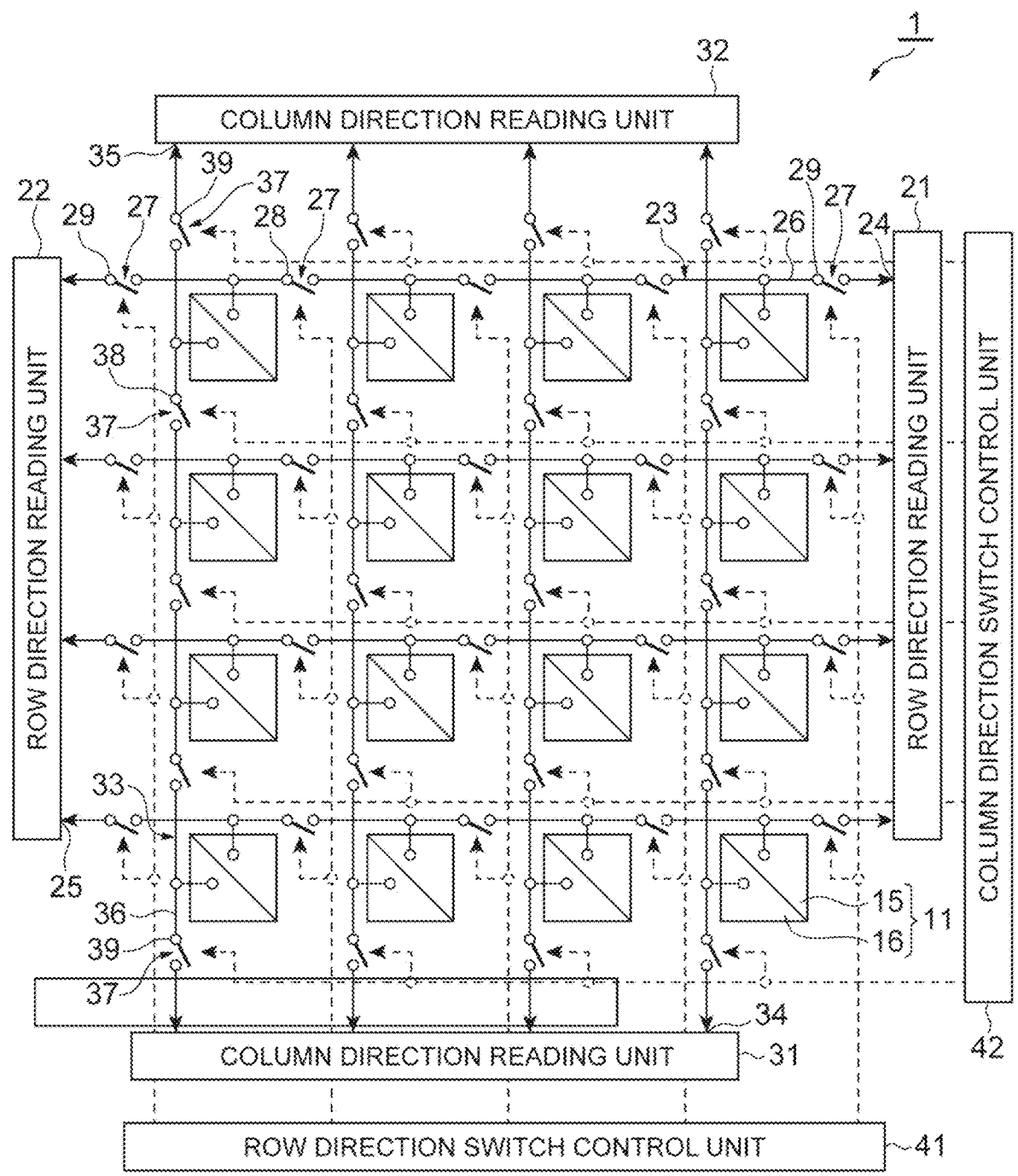
FIG. 2 is a schematic circuit diagram of the light detection device.

First, with reference to FIGS. 1 and 2, the entire configuration of a light detection device according to the present embodiment will be described. FIG. 1 is a block diagram of the light detection device according to the present embodiment. FIG. 2 is a schematic circuit diagram of the light detection device according to the present embodiment.

A light detection device 1 is a profile sensor for detecting a two-dimensional incident position of light and reads a signal generated due to incident light as two-dimensional projection data corresponding to an incident position, that is, a two-dimensional profile. In the present embodiment, the light detection device 1 continuously detects the incident position of a spot of light in a plurality of frames. Here, "a frame" denotes one period of light detection performed by the light detection device 1.

The light detection device 1 includes a sensor light receiving unit 10, row direction reading units 21 and 22, column direction reading units 31 and 32, a row direction switch control unit 41, and a column direction switch control unit 42. Projection data of a signal generated by the sensor light receiving unit 10 due to a received spot of light is read by the row direction reading unit 21 and the column direction reading unit 31. For example, when the row direction reading units 21 and 22 are included in a first reading unit, the column direction reading units 31 and 32 are included in a second reading unit.

As illustrated in FIG. 2, the sensor light receiving unit 10 has a plurality of pixels 11, a sensor circuit 23 for connecting the plurality of pixels 11 to the row direction reading unit 21, and a sensor circuit 33 for connecting the plurality of pixels 11 to the column direction reading unit 31. For example, when the sensor circuit 23 is included in a first circuit, the sensor circuit 33 is included in a second circuit.

The plurality of pixels 11 are arranged two-dimensionally in a matrix. A "matrix" also includes a two-dimensional closest packing pattern such as a honeycomb pattern. Each of the plurality of pixels 11 includes a photosensitive portion 15 and a photosensitive portion 16. Each of the photosensitive portions 15 and 16 includes a light receiving element such as a photodiode. Each of the photosensitive portions 15 and 16 may include a plurality of light receiving elements. For example, when the photosensitive portions 15 are included in first photosensitive portions, the photosensitive portions 16 are included in second photosensitive portions.

The photosensitive portion 15 and the photosensitive portion 16 included in the same pixel 11 are adjacent to each other when viewed in a direction orthogonal to a row direction and a column direction. That is, in the sensor light receiving unit 10, a plurality of photosensitive portions 15 and a plurality of photosensitive portions 16 are arranged in each of the pixels 11 in the row direction and the column direction.

In each row, the sensor circuit 23 has two output ports 24 and 25 for individually outputting signal data from the plurality of photosensitive portions 15 arranged in the same row. The row direction reading units 21 and 22 read signal data through two output ports 24 and 25, respectively. One output port or three or more output ports may be provided in the same row. In the present embodiment, the row direction reading unit 21 reads signal data through the output port 24, and the row direction reading unit 22 reads signal data through the output port 25.

As illustrated in FIG. 2, the sensor circuit 23 has a plurality of wirings 26 and a plurality of row switches 27 physically connected to the plurality of wirings 26. The sensor circuit 23 electrically connects the plurality of photosensitive portions 15 arranged in the sensor light receiving unit 10 to each other for every row via the wirings 26 and the row switches 27. Each of the photosensitive portions 15 is electrically connected to the corresponding wiring 26. At least one of the plurality of row switches 27 switches electrical connection and disconnection between the photosensitive portions 15 adjacent to each other in the same row. Turning ON/OFF of each of the row switches 27 is controlled by the row direction switch control unit 41. In the present embodiment, the plurality of row switches 27 are disposed in each row.

When the plurality of row switches 27 disposed in the same row are turned on by the row direction switch control unit 41, the sensor circuit 23 electrically connects the plurality of photosensitive portions 15 arranged in the same row to each other through the plurality of row switches 27 and the wirings 26 connected to the plurality of row switches 27. When all the plurality of row switches 27 disposed in the same row are turned on by the row direction switch control unit 41, all the plurality of photosensitive portions 15 arranged in the same row are electrically connected to the row direction reading units 21 and 22.

In the present embodiment, as illustrated in FIG. 2, in each row, the sensor circuit 23 has the plurality of wirings 26 extending in the row direction in the same row and the plurality of row switches 27 connecting the wirings 26 to each other in the same row. The plurality of row switches 27 include a plurality of inter-row pixel switches 28 and a plurality of row reading switches 29.

In each row, regarding all the photosensitive portions 15 arranged in the same row, the plurality of inter-row pixel switches 28 are disposed individually between the wirings 26 connected to the respective photosensitive portions 15. Accordingly, each of the inter-row pixel switches 28 switches electrical connection and disconnection between the photosensitive portions 15 adjacent to each other in the same row. For example, from a state in which all the plurality of inter-row pixel switches 28 disposed in the same row are turned on, when any one thereof is turned off, the plurality of photosensitive portions 15 arranged in the same row are divided into two groups electrically insulated from each other in the row direction.

In each row, the plurality of row reading switches 29 are disposed individually between the wirings 26 connected to the photosensitive portions 15 which are closest to the row direction reading units 21 and 22 among the photosensitive portions 15 arranged in the same row, and the respective output ports 24 and 25. Accordingly, each of the row reading switches 29 switches electrical connection and disconnection between at least one of the photosensitive portions 15 and the row direction reading unit 21 or 22.

In each column, the sensor circuit 33 has two output ports 34 and 35 for individually outputting signal data from the plurality of photosensitive portions 16 arranged in the same column. The column direction reading units 31 and 32 read signal data from the two output ports 34 and 35, respectively. One output port or three or more output ports may be provided in the same column. In the present embodiment, the column direction reading unit 31 reads signal data through the output port 34, and the column direction reading unit 32 reads signal data through the output port 35.

As illustrated in FIG. 2, the sensor circuit 33 has a plurality of wirings 36 and a plurality of column switches 37 physically connected to the plurality of wirings 36. The sensor circuit 33 electrically connects the plurality of photosensitive portions 16 arranged in the sensor light receiving unit 10 to each other for every column via the wirings 36 and the column switches 37. Each of the photosensitive portions 16 is electrically connected to the corresponding wiring 36. At least one of the plurality of column switches 37 switches electrical connection and disconnection between the photosensitive portions 16 adjacent to each other in the same column. Turning ON/OFF of each of the column switches 37 is controlled by the column direction switch control unit 42. In the present embodiment, the plurality of column switches 37 are disposed in each column.

When the plurality of column switches 37 disposed in the same column are turned on by the column direction switch control unit 42, the sensor circuit 33 electrically connects the plurality of photosensitive portions 16 arranged in the same column to each other through the plurality of column switches 37 and the wirings 36 connected to the plurality of column switches 37. When all the plurality of column switches 37 disposed in the same column are turned on by the column direction switch control unit 42, all the plurality of photosensitive portions 16 arranged in the same column are electrically connected to the column direction reading units 31 and 32.

In the present embodiment, as illustrated in FIG. 2, in each column, the sensor circuit 33 has a plurality of wirings 36 extending in the column direction in the same column and the plurality of column switches 37 connecting the wirings 36 to each other in the same column. The plurality of column switches 37 include a plurality of inter-column pixel switches 38 and a plurality of column reading switches 39.

In each column, regarding all the photosensitive portions 16 arranged in the same column, the plurality of inter-column pixel switches 38 are disposed individually between the wirings 36 connected to the respective photosensitive portions 16. Accordingly, each of the inter-column pixel switches 38 switches electrical connection and disconnection between the photosensitive portions 16 adjacent to each other in the same column. For example, from a state in which all the plurality of inter-column pixel switches 38 disposed in the same column are turned on, when any one thereof is turned off, the plurality of photosensitive portions 16 arranged in the same column are divided into two groups electrically insulated from each other in the column direction.

In each column, the plurality of column reading switches 39 are disposed individually between the wirings 36 connected to the photosensitive portions 16 which are closest to the column direction reading units 31 and 32 among the photosensitive portions 16 arranged in the same column, and the respective output ports 34 and 35. Accordingly, each of the column reading switches 39 switches electrical connection and disconnection between at least one of the photosensitive portions 16 and the column direction reading unit 31 or 32.

Figure 3:
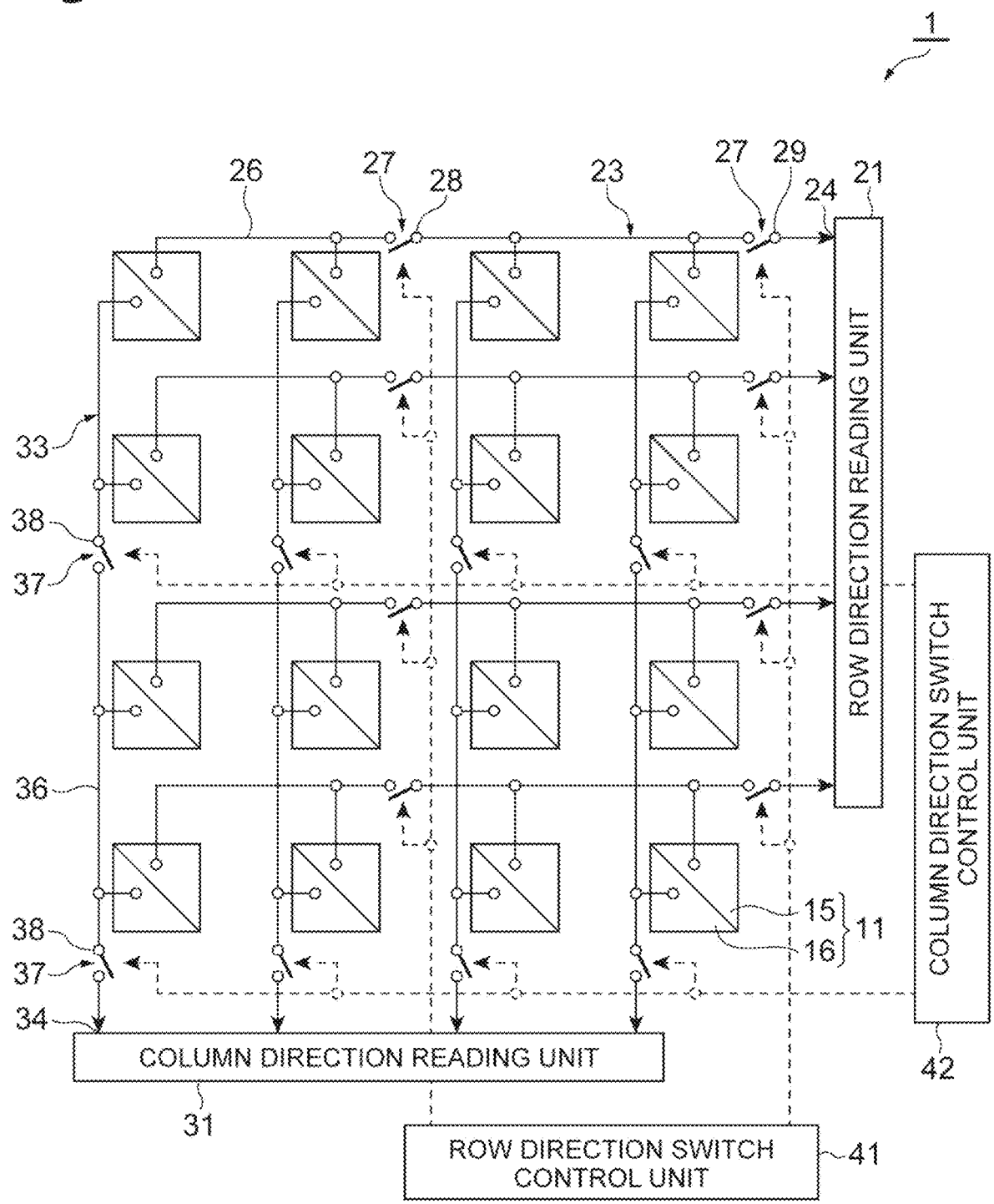
FIG. 3 is a schematic circuit diagram of the light detection device according to a modification example of the present embodiment.

FIG. 3 is a schematic circuit diagram of the light detection device 1 according to a modification example of the present embodiment. In the configuration illustrated in FIG. 3, in each row, the sensor circuit 23 has one output port 24 for outputting signal data from the plurality of photosensitive portions 15 arranged in the same row, and signal data is read by the row direction reading unit 21 through only this output port 24. In this case as well, two or more output ports may be provided in the same row. In each column, the sensor circuit 33 has one output port 34 for outputting signal data from the plurality of photosensitive portions 16 arranged in the same column, and signal data is read by the column direction reading unit 31 through only this output port 34. In this case as well, two or more output ports may be provided in the same column.

Similar to the configuration illustrated in FIG. 2, in each row, the sensor circuit 23 has a plurality of wirings 26 extending in the row direction in the same row and the plurality of row switches 27 connecting the wirings 26 to each other in the same row. The plurality of row switches 27 include a plurality of inter-row pixel switches 28 and a plurality of row reading switches 29. Each of the inter-row pixel switches 28 switches electrical connection and disconnection between the photosensitive portions 15 adjacent to each other in the same row.

In the configuration illustrated in FIG. 3, the plurality of wirings 26 extending in the row direction in the same row are connected to the plurality of photosensitive portions 15, respectively. In each row, the plurality of inter-row pixel switches 28 are disposed individually between the plurality of wirings 26 in the same row. Accordingly, each of the inter-row pixel switches 28 switches electrical connection and disconnection between the wirings 26 connected to the plurality of photosensitive portions 15 in the same row. That is, when one of the inter-row pixel switches 28 is turned off, the plurality of photosensitive portions 15 arranged in the same row are divided into two groups electrically insulated from each other in the row direction. The number of the plurality of inter-row pixel switches 28 disposed in the same row may be two or more.

Similar to the configuration illustrated in FIG. 2, in each column, the sensor circuit 33 has a plurality of wirings 36 extending in the column direction in the same column and the plurality of column switches 37 connecting the wirings 36 to each other in the same column. The plurality of column switches 37 include a plurality of inter-column pixel switches 38 and a plurality of column reading switches 39. Each of the inter-column pixel switches 38 switches electrical connection and disconnection between the photosensitive portions 16 adjacent to each other in the same column.

In the configuration illustrated in FIG. 3, the plurality of wirings 36 extending in the column direction in the same column are connected to the plurality of photosensitive portions 16, respectively. In each column, the plurality of inter-column pixel switches 38 are disposed individually between the plurality of wirings 36 in the same column. Accordingly, each of the inter-column pixel switches 38 switches electrical connection and disconnection between the wirings 36 connected to the plurality of photosensitive portions 16 in the same column. That is, when one of the inter-column pixel switches 38 is turned off, the plurality of photosensitive portions 16 arranged in the same column are divided into two groups electrically insulated from each other in the column direction. The number of the plurality of inter-column pixel switches 38 disposed in the same column may be two or more.

Figure 4:
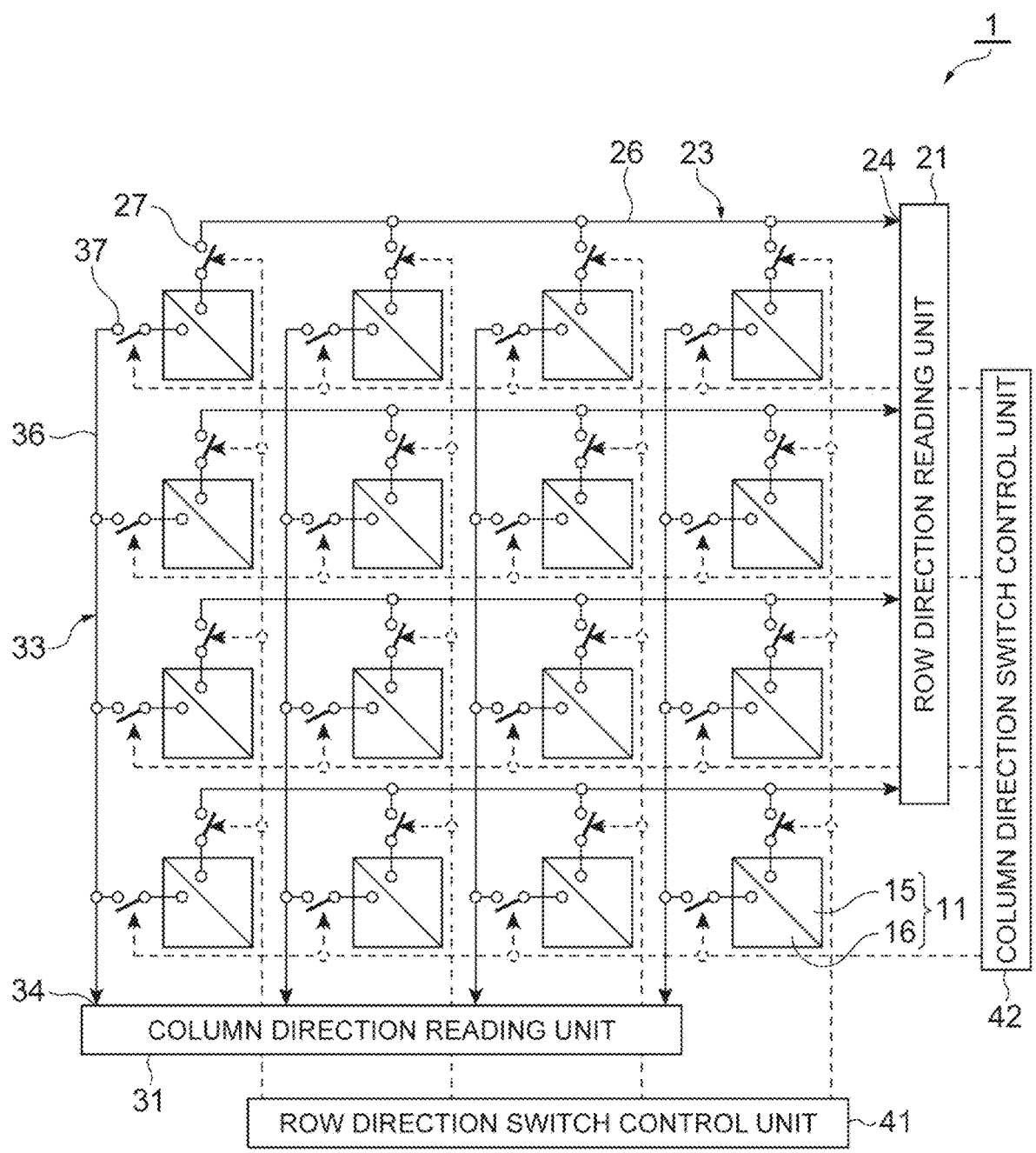
FIG. 4 is a schematic circuit diagram of the light detection device according to another modification example of the present embodiment.

FIG. 4 is a schematic circuit diagram of the light detection device 1 according to another modification example of the present embodiment. Similar to the configuration illustrated in FIG. 3, in each row, the sensor circuit 23 has one output port 24 for outputting signal data from the plurality of photosensitive portions 15 arranged in the same row, and signal data is read by the row direction reading unit 21 through only this output port 24. In this case as well, two or more output ports may be provided in the same row. In each column, the sensor circuit 33 has one output port 34 for outputting signal data from the plurality of photosensitive portions 16 arranged in the same column, and signal data is read by the column direction reading unit 31 through only this output port 34. In this case as well, two or more output ports may be provided in the same column.

In the configuration illustrated in FIG. 4, in each row, the sensor circuit 23 has one wiring 26 extending in the row direction in the same row and a plurality of row switches 27 connecting the wiring 26 and the plurality of photosensitive portions 15 to each other in the same row. That is, one row switch 27 is connected to each of the photosensitive portions 15. When the corresponding row switch 27 is turned on, each of the photosensitive portions 15 is electrically connected to the row direction reading unit 21 through the output port 24 and the wiring 26. The row switches 27 switch electrical connection and disconnection between the photosensitive portions 15 adjacent to each other in the same row.

In the configuration illustrated in FIG. 4, in each column, the sensor circuit 33 has one wiring 36 extending in the column direction in the same column and a plurality of column switches 37 connecting the wiring 36 and the plurality of photosensitive portions 16 to each other in the same column. That is, one column switch 37 is connected to each of the photosensitive portions 16. When the corresponding column switch 37 is turned on, each of the photosensitive portions 16 is electrically connected to the column direction reading unit 31 through the output port 34 and the wiring 36. The column switches 37 switch electrical connection and disconnection between the photosensitive portions 16 adjacent to each other in the same column.

Next, the row direction reading unit 21 and the column direction reading unit 31 which are connected to the sensor light receiving unit 10, and the row direction switch control unit 41 and the column direction switch control unit 42 in the present embodiment will be described. For example, when the row direction switch control unit 41 is included in a row direction dividing unit, the column direction switch control unit 42 is included in a column direction dividing unit.

The row direction reading units 21 and 22, the column direction reading units 31 and 32, the row direction switch control unit 41, and the column direction switch control unit 42 are constituted of hardware constituted of various kinds of logic circuits such as AND/OR/NOT/XOR gates and including a register, a memory, a comparator, a computation unit, a multiplexer, a selector, an A/D converter, and a power source control circuit and the like. Moreover, a part or the entireties of the row direction reading units 21 and 22, the column direction reading units 31 and 32, the row direction switch control unit 41, and the column direction switch control unit 42 may be constituted of an integrated circuit such as an application specific integrated circuit (ASIC) or a field programmable gate array (FPGA). The row direction reading units 21 and 22, the column direction reading units 31 and 32, the row direction switch control unit 41, and the column direction switch control unit 42 are controlled and operated in accordance with a built-in control program, an external control program, various kinds of control signals, or the like.

The row direction reading units 21 and 22 read signal data from the plurality of photosensitive portions 15 through the plurality of wirings 26. At this time, outputs from the plurality of photosensitive portions 15 electrically connected to the row direction reading units 21 and 22 in the same row are summed in accordance with the ON/OFF state of each of the row switches 27. Accordingly, continuously in a plurality of frames, the row direction reading units 21 and 22 read signal data projected in the row direction. Signal data projected in the row direction is also referred to as a row direction profile, for example. The column direction reading units 31 and 32 read signal data from the plurality of photosensitive portions 16 through the plurality of wirings 36. At this time, outputs from the plurality of photosensitive portions 16 electrically connected to the column direction reading units 31 and 32 in the same column are summed in accordance with the ON/OFF state of each of the column switches 37. Accordingly, continuously in a plurality of frames, the column direction reading units 31 and 32 read signal data projected in the column direction. Signal data projected in the column direction is also referred to as a column direction profile, for example.

The row direction reading units 21 and 22 and the column direction reading units 31 and 32 compute feature amounts such as a centroid position in the projected signal data, a peak position, a profile width of the signal data, and a brightness. Accordingly, each of the row direction reading units 21 and 22 and the column direction reading units 31 and 32 computes an incident position of the spot of light on the sensor light receiving unit 10, that is, a region irradiated with the spot of light in the sensor light receiving unit 10, in the row direction and the column direction. The feature amounts and the incident position of the spot of light may be computed by the row direction switch control unit 41 and the column direction switch control unit 42 or may be computed outside the light detection device 1.

The row direction reading units 21 and 22 compute a centroid position from signal data projected in the row direction in a signal output through at least some of the plurality of wirings 26. The column direction reading units 31 and 32 compute a centroid position from signal data projected in the column direction in a signal output through at least some of the plurality of wirings 36. Here, a centroid position computed by the row direction reading units 21 and 22 and the column direction reading units 31 and 32 is a centroid position in signal data projected in the row direction and the column direction in a signal output through at least some of the plurality of wirings 26 and the plurality of wirings 36. There is concern that each of the computed centroid positions may not strictly coincide with the actual position of the physically disposed pixel 11. For this reason, as a centroid position, the row direction reading units 21 and 22 and the column direction reading units 31 and 32 may output a position approximating the foregoing centroid position computed from signal data, for example, a position of the pixel 11 closest to the computed centroid position. As a centroid position, the row direction reading units 21 and 22 and the column direction reading units 31 and 32 may output a peak position at which the value of the pixel has the maximum brightness. The value of the pixel is a brightness, for example. The maximum brightness is the maximal value, for example.

The row direction switch control unit 41 controls switching the ON/OFF state of each of the row switches 27. In the present embodiment, the row direction switch control unit 41 performs feedback control of turning ON/OFF of each of the row switches 27 based on the signal data read by the row direction reading units 21 and 22 and the column direction reading units 31 and 32.

The column direction switch control unit 42 controls switching the ON/OFF state of each of the column switches 37. In the present embodiment, the column direction switch control unit 42 performs feedback control of turning ON/OFF of each of the column switches 37 based on the signal data read by the row direction reading units 21 and 22 and the column direction reading units 31 and 32.

Next, functional blocks of the row direction reading units 21 and 22 and the column direction reading units 31 and 32 will be described in detail. As illustrated in FIG. 1, each of the row direction reading units 21 and 22 has a row direction pixel selecting unit 51, a row direction skipping selecting unit 52, and a row direction binning reading unit 53. Each of the column direction reading units 31 and 32 has a column direction pixel selecting unit 61, a column direction skipping selecting unit 62, and a column direction binning reading unit 63.

The row direction pixel selecting unit 51 and the column direction pixel selecting unit 61 select a pixel group for reading signal data from the plurality of pixels 11 constituting the sensor light receiving unit 10. In the present embodiment, the row direction pixel selecting unit 51 selects a photosensitive portion 15, that is, a pixel for reading signal data by selecting at least one wiring 26 for reading signal data from the plurality of wirings 26. The column direction pixel selecting unit 61 selects a photosensitive portion 16, that is, a pixel for reading signal data by selecting at least one wiring 36 for reading signal data from the plurality of wirings 36. In the present embodiment, when a plurality of wirings 26 are selected, the row direction pixel selecting unit 51 selects a plurality of wirings 26 adjacent to each other. When a plurality of wirings 36 are selected, the column direction pixel selecting unit 61 selects a plurality of wirings 36 adjacent to each other.

In the present embodiment, the row direction pixel selecting unit 51 selects a pixel group for reading signal data based on the signal data read by the row direction reading units 21 and 22. The column direction pixel selecting unit 61 selects a pixel group for reading signal data based on the signal data read by the column direction reading units 31 and 32. The row direction pixel selecting unit 51 and the column direction pixel selecting unit 61 may select a pixel column set in advance when a predetermined condition is satisfied or may select a pixel column in which a brightness equal to or higher than a predetermined threshold is detected. For example, this predetermined threshold is a value obtained from feature amounts such as a detected brightness, a peak position, and a profile width or an arbitrary value set by a user.

The row direction reading units 21 and 22 perform reading of signal data from the wiring 26 selected by the row direction pixel selecting unit 51. In other words, signal data is read from the photosensitive portion 15 connected to the wiring 26 which is selected by the row direction pixel selecting unit 51. The column direction reading units 31 and 32 perform reading of signal data from the wiring 36 selected by the column direction pixel selecting unit 61. In other words, signal data is read from the photosensitive portion 16 connected to the wiring 36 selected by the column direction pixel selecting unit 61.

Figure 5:
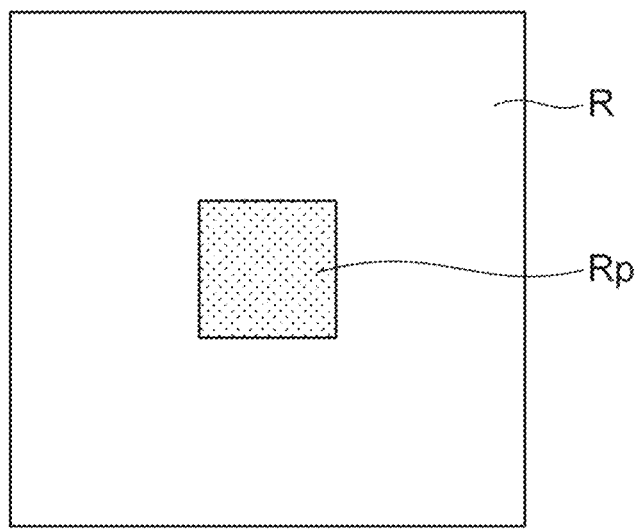
FIG. 5 is a view illustrating partial reading.

For example, as illustrated in FIG. 5, as a pixel group for reading signal data, the row direction pixel selecting unit 51 and the column direction pixel selecting unit 61 select pixels 11 arranged in a region Rp that is a part of a region R in which a plurality of pixels 11 constituting the sensor light receiving unit 10 are arranged. In this case, partial reading is performed from the pixels 11 arranged in the region Rp. Partial reading means reading a signal from only the pixels 11 arranged in a region that is a part of regions in which the plurality of pixels 11 are arranged. In FIG. 5, in order to discriminate the region Rp and regions other than the region Rp from each other, the region Rp is illustrated with dot-hatching.

As a pixel group for reading signal data, the row direction pixel selecting unit 51 and the column direction pixel selecting unit 61 may select pixels 11 arranged in a region set in advance or may select pixels 11 in which a brightness equal to or higher than a predetermined threshold is detected. For example, this predetermined threshold is a value obtained from feature amounts such as a detected brightness, a peak position, and a profile width or an arbitrary value set by a user.

When the plurality of pixels 11, that is, the photosensitive portions 15 are divided into a plurality of groups by turning ON/OFF the row switches 27, the row direction pixel selecting unit 51 selects a pixel group for reading signal data from the plurality of pixels 11 within each group. When the plurality of pixels 11, that is, the photosensitive portions 16 are divided into a plurality of groups by turning ON/OFF the column switches 37, the column direction pixel selecting unit 61 selects a pixel group for reading signal data from the plurality of pixels 11 within each group. For example, in the example illustrated in FIG. 7, a spot of light A, a spot of light B, and a spot of light C are incident on regions R1, R2, and R3, respectively. As a pixel group for reading signal data, the row direction pixel selecting unit 51 and the column direction pixel selecting unit 61 select pixels 11 arranged in regions Ra, Rb, and Rc that are a part of the regions R1, R2, and R3.

The row direction skipping selecting unit 52 and the column direction skipping selecting unit 62 select a pixel column from which no signal data is read, that is, a pixel column to skip. In the present embodiment, the row direction skipping selecting unit 52 and the column direction skipping selecting unit 62 select a pixel column to skip from the pixel group selected by the row direction pixel selecting unit 51 and the column direction pixel selecting unit 61. The row direction skipping selecting unit 52 selects a photosensitive portion 15 to skip from the plurality of photosensitive portions 15 selected by the row direction pixel selecting unit 51. The column direction skipping selecting unit 62 select a photosensitive portion 16 to skip from the plurality of photosensitive portions 16 selected by the column direction pixel selecting unit 61.

Figure 6:
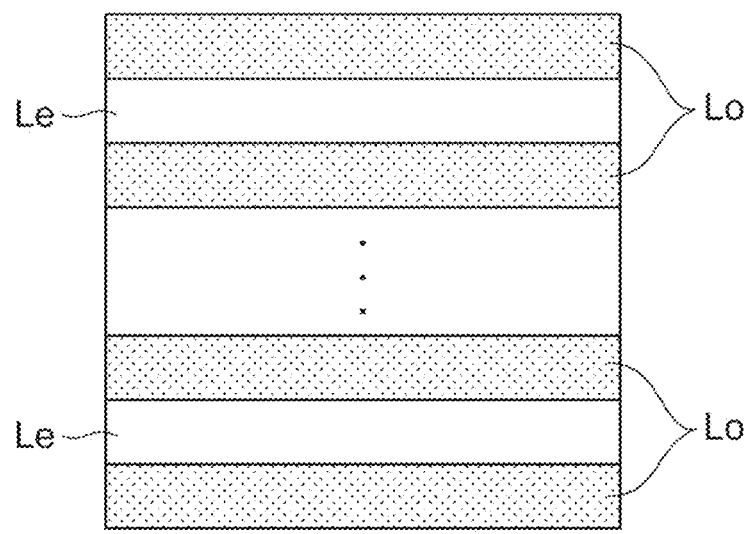
FIG. 6 is a view illustrating skipping.

For example, as illustrated in FIG. 6, when the row direction skipping selecting unit 52 selects pixel columns arranged in even-numbered rows Le, the row direction reading units 21 and 22 read signal data from the pixel columns arranged in odd-numbered rows Lo and do not read signal data from the pixel columns arranged in the even-numbered rows Le. When the column direction skipping selecting unit 62 selects pixel columns arranged in the even-numbered rows Le, the column direction reading units 31 and 32 read signal data from the pixel columns arranged in the odd-numbered rows Lo and do not read signal data from the pixel columns arranged in the even-numbered rows Le.

The rows to be read and the rows not to be read may be reversed between the odd-numbered rows Lo and the even-numbered rows Le.

In the example illustrated in FIG. 6, the row direction skipping selecting unit 52 and the column direction skipping selecting unit 62 select pixel columns to skip every other row, but they may select pixel columns to skip every other multiple rows. The row direction skipping selecting unit 52 and the column direction skipping selecting unit 62 may select pixel columns to skip from the pixel group which is not selected by the row direction pixel selecting unit 51 and the column direction pixel selecting unit 61. In this case, the row direction reading units 21 and 22 and the column direction reading units 31 and 32 read signal data from pixels 11 other than the pixel columns selected by the row direction skipping selecting unit 52 and the column direction skipping selecting unit 62. In FIG. 6, in order to discriminate the odd-numbered rows Lo and the even-numbered rows Le from each other, the odd-numbered rows Lo are illustrated with dot-hatching.

The row direction skipping selecting unit 52 and the column direction skipping selecting unit 62 may select a pixel column set in advance when a predetermined condition is satisfied or may select a pixel column in which a brightness equal to or lower than a predetermined threshold is detected. For example, this predetermined threshold is a value obtained from feature amounts such as a detected brightness, a peak position, and a profile width or an arbitrary value set by a user. When the plurality of pixels 11, that is, the photosensitive portions 15 are divided into a plurality of groups by turning ON/OFF the row switches 27, the row direction skipping selecting unit 52 selects pixel columns to skip for each group. When the plurality of pixels 11, that is, the photosensitive portions 16 are divided into a plurality of groups by turning ON/OFF the column switches 37, the column direction skipping selecting unit 62 selects pixel columns to skip for each group.

The row direction binning reading unit 53 reads signals output from the pixels 11 arranged in a pixel group set in advance or a pixel group selected by the row direction pixel selecting unit 51, that is, signals output from a pixel group through binning reading. The column direction binning reading unit 63 reads signals output from the pixels 11 arranged in a pixel group set in advance or a pixel group selected by the column direction pixel selecting unit 61, that is, signals output from a pixel group through binning reading. In the present embodiment, the row direction binning reading unit 53 reads signal data by compiling, into one signal, information of signals output from the plurality of photosensitive portions 15 connected to a predetermined number of wirings 26 disposed adjacent to each other of the plurality of wirings 26 selected by the row direction pixel selecting unit 51. The column direction binning reading unit 63 reads signal data by compiling, into one signal, information of signals output from the plurality of photosensitive portions 16 connected to a predetermined number of wirings 36 disposed adjacent to each other of the plurality of wirings 36 selected by the column direction pixel selecting unit 61.

The foregoing predetermined numbers of wirings 26 and 36 may be set by a user or may be set in advance for each of various conditions. When the plurality of pixels 11, that is, the photosensitive portions 15 are divided into a plurality of groups by turning ON/OFF the row switches 27, the row direction binning reading unit 53 reads signal data by compiling, into one signal, information of signals output from the plurality of photosensitive portions 15 arranged in a plurality of rows within at least one group. When the plurality of pixels 11, that is, the photosensitive portions 16 are divided into a plurality of groups by turning ON/OFF the column switches 37, the column direction binning reading unit 63 reads signal data by compiling, into one signal, information of signals output from the plurality of photosensitive portions 16 arranged in a plurality of columns within at least one group.

As the signal data described above, the row direction binning reading unit 53 reads the sum of signals output from the plurality of wirings 26 using an adding circuit. As the signal data described above, the row direction binning reading unit 53 may be configured to read the logical sum of signals output from the plurality of wirings 26 through a wired line OR. As the signal data described above, the column direction binning reading unit 63 reads the sum of signals output from the plurality of wirings 36 using an adding circuit. As the signal data described above, the column direction binning reading unit 63 may be configured to read the logical sum of signals output from the plurality of wirings 36 through the wired line OR.

As the signal data described above, each of the row direction binning reading unit 53 and the column direction binning reading unit 63 may read the median value of signals output from the plurality of wirings 26 and 36, and may read the average of the sums of signals output from the plurality of wirings 26 and 36. As the signal data described above, each of the row direction binning reading unit 53 and the column direction binning reading unit 63 may read a peak value of signal data in which signals output from the plurality of wirings 26 and 36 are projected, that is, a value obtained from feature amounts such as a peak value, a peak position, and a profile width of a profile.

Next, with reference to FIGS. 7 to 13, control performed by the row direction switch control unit 41 and the column direction switch control unit 42 will be described in detail.

The row direction switch control unit 41 and the column direction switch control unit 42 divide a plurality of pixels 11 into a plurality of groups such that signals generated due to the incidence of the spot of light A, the spot light B, and the spot light C are detected as pieces of signal data different from each other. That is, the regions in which the plurality of pixels 11 are arranged are partitioned in the sensor light receiving unit 10 such that the spot of light A, the spot of light B, and the spot of light C enter regions different from each other.

The row direction switch control unit 41 controls the plurality of row switches 27 based on the signal data of the plurality of the spots of light A, B and C incident on the sensor light receiving unit 10. Specifically, the row direction switch control unit 41 partitions the regions in which the plurality of pixels 11 are arranged in the sensor light receiving unit 10 based on the signal data read by at least one of the row direction reading units 21 and 22 and the column direction reading units 31 and 32. Accordingly, the row direction switch control unit 41 divides the plurality of pixels 11 into a plurality of groups corresponding to the incident positions of the respective spots of light A, B and C.

Figure 7:
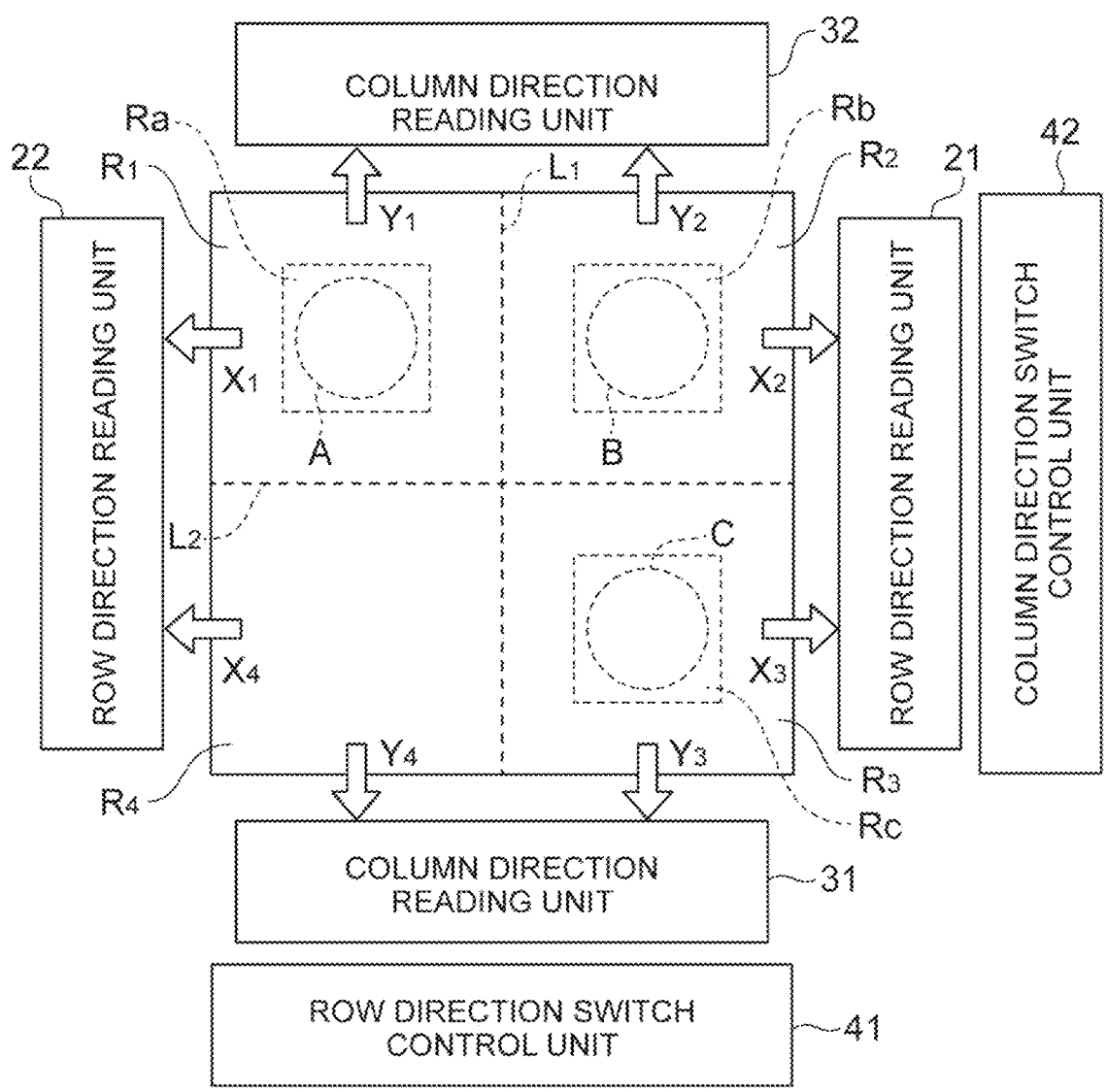
FIG. 7 is a view illustrating the light detection device reading signal data.

Through this control, for example, as illustrated in FIG. 7, the row direction switch control unit 41 divides the plurality of photosensitive portions 15 into two groups which are electrically insulated from each other. In the present embodiment, the row direction switch control unit 41 divides the plurality of photosensitive portions 15 into two groups which are electrically insulated from each other along a straight line L1 parallel to the column direction. The row direction switch control unit 41 may divide the plurality of photosensitive portions 15 into three or more groups. The row direction reading units 21 and 22 read signal data for each of the groups divided off by the row direction switch control unit 41.

In the present embodiment, as illustrated in FIG. 7, the row direction switch control unit 41 divides the plurality of photosensitive portions 15 into two groups such that the photosensitive portions 15 on which the spot of light A is incident and the photosensitive portions 15 on which the spots of light B and C are incident form groups different from each other. As a result, signal data X1 and signal data X4 of a group on which the spot of light A is incident and signal data X2 and signal data X3 of a group on which the spots of light B and C are incident are separately read from the row direction reading units 21 and 22 in reading after the grouping. In the present embodiment, the signal data X2 and the signal data X3 are read from the row direction reading unit 21, and the signal data X1 and the signal data X4 are read from the row direction reading unit 22. The same row direction reading units 21 and 22 may separately read the signal data X2 and the signal data X3, and the signal data X1 and the signal data X4 in a manner of being divided by time.

The column direction switch control unit 42 controls the plurality of column switches 37 based on the signal data of the plurality of the spots of light A, B and C incident on the sensor light receiving unit 10. Specifically, the column direction switch control unit 42 partitions the regions in which the plurality of pixels 11 are arranged in the sensor light receiving unit 10 based on the signal data read by at least one of the row direction reading units 21 and 22 and the column direction reading units 31 and 32. Accordingly, the column direction switch control unit 42 divides the plurality of pixels 11 into a plurality of groups corresponding to the incident positions of the respective spots of light A, B and C.

Through this control, for example, as illustrated in FIG. 7, the column direction switch control unit 42 divides the plurality of photosensitive portions 16 into two groups which are electrically insulated from each other. In the present embodiment, the column direction switch control unit 42 divides the plurality of photosensitive portions 16 into two groups which are electrically insulated from each other along a straight line L2 parallel to the row direction. The column direction switch control unit 42 may divide the plurality of photosensitive portions 16 into three or more groups. The column direction reading units 31 and 32 read signal data for each of the groups divided off by the column direction switch control unit 42.

In the present embodiment, as illustrated in FIG. 7, the column direction switch control unit 42 divides the plurality of photosensitive portions 16 into two groups such that the photosensitive portions 16 on which the spot of light A is incident and the photosensitive portions 16 on which the spots of light B and C are incident form groups different from each other. As a result, signal data Y1 and signal data Y2 of a group on which the spots of light A and B are incident and signal data Y3 and signal data Y4 of a group on which the spot of light C is incident are separately read from the column direction reading units 31 and 32 in reading after the grouping. In the present embodiment, the signal data Y1 and the signal data Y2 are read from the column direction reading unit 31, and the signal data Y3 and the signal data Y4 are read from the column direction reading unit 32. The same column direction reading units 31 and 32 may separately read the signal data Y1 and the signal data Y2, and the signal data Y3 and the signal data Y4 in a manner of being divided by time.

When a detection result of at least one of spots of light satisfies a predetermined condition, the row direction switch control unit 41 and the column direction switch control unit 42 perform grouping of the plurality of photosensitive portions 15 and 16 again. That is, when a predetermined condition is satisfied, the row direction switch control unit 41 and the column direction switch control unit 42 change the position (division position) of the straight line L1 or the straight line L2 serving as a standard of partitioning regions in which the plurality of pixels 11 are arranged.

Figure 8:
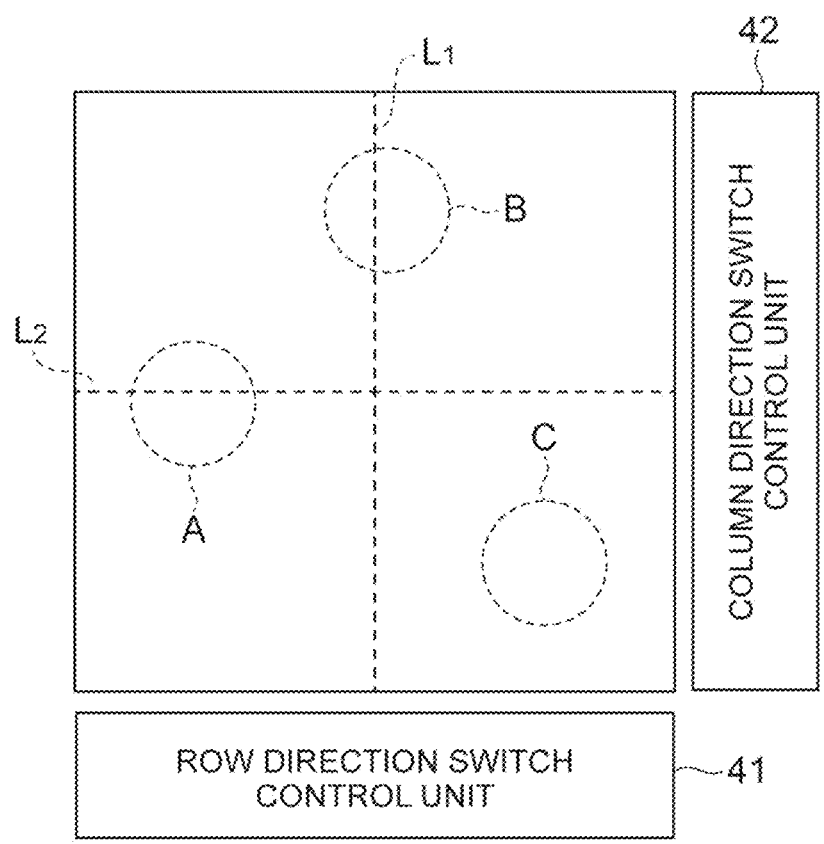
FIG. 8 is a view illustrating grouping.
Figure 9:
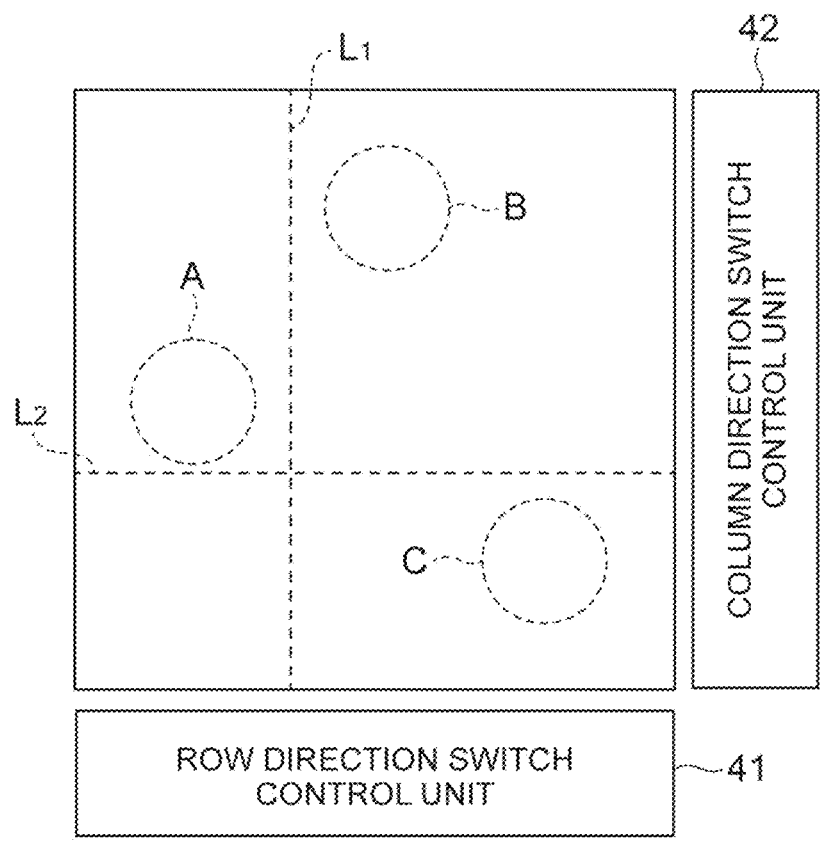
FIG. 9 is another view illustrating grouping.

For example, as illustrated in FIG. 8, when the spot of light B is detected in both the region R1 and the region R2, the row direction switch control unit 41 changes the position of partitioning the region R1 and the region R2, that is, the position of dividing off a group as illustrated in FIG. 9 by changing the row switches 27 to be turned off.

In this case, the row direction switch control unit 41 divides the plurality of photosensitive portions 16 into two groups again such that the photosensitive portions 16 on which the spot of light A is incident and the photosensitive portions 16 on which the spots of light B and C are incident form groups different from each other.

Similarly, as illustrated in FIG. 8, when the spot of light A is detected in the region R1 and a region R4, the column direction switch control unit 42 changes the position of partitioning the region R1 and the region R4 as illustrated in FIG. 9 by changing the column switches 37 to be turned off. The row direction switch control unit 41 and the column direction switch control unit 42 determines whether or not to change the position of the straight line L1 or the straight line L2, that is, the position of dividing off a group based on the size of each region, the feature amount of an output in each region, and the threshold set to each feature amount. For example, the size of each region is the number of pixels 11 arranged in each region. For example, the feature amount includes a peak position, a two-dimensional centroid position, a brightness, and the like. The position of the straight line L1 or the straight line L2 is also referred to as a division position.

In the present embodiment, whether or not the row direction switch control unit 41 and the column direction switch control unit 42 change the position of the straight line L1 or the straight line L2 is judged based on a change over time in the peak position and the brightness of each of the spots of light A, B and C in each of the regions R1, R2, R3, and R4. For example, a case in which the spot of light A which has been detected in only the region R1 in a first frame moves to the region R2 side in a second frame subsequent to the first frame will be considered. Similar to "a frame", "a first frame" and "a second frame" denote periods of one light detection performed by the light detection device 1. "A first frame" is an arbitrary frame of light detection in the light detection device 1. Hereinafter, a second frame will be considered as a frame subsequent to the first frame.

Figure 10:
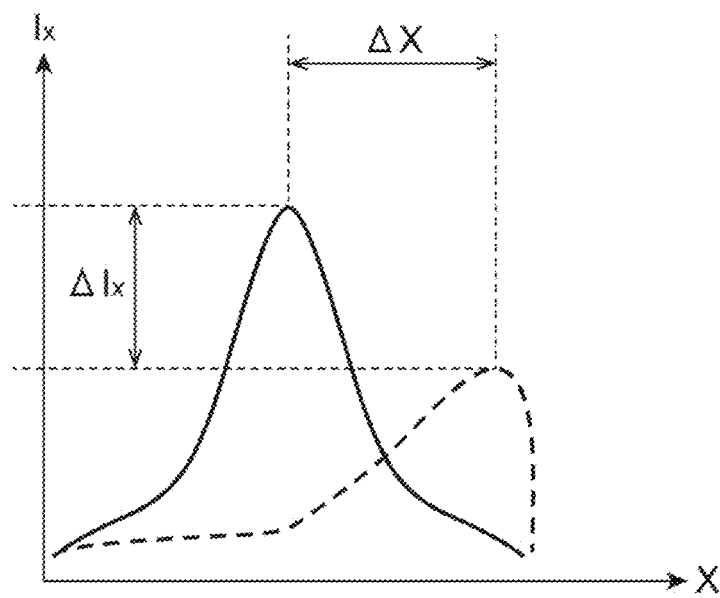
FIG. 10 is a view illustrating a reset condition for grouping.
Figure 11:
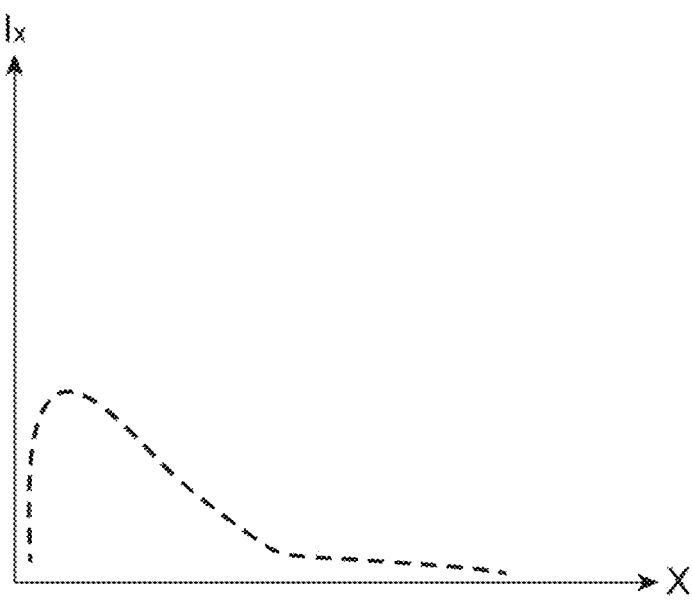
FIG. 11 is a view illustrating another reset condition for grouping.

In this case, in the region R1, what the peak position of a spot of light which has been detected in the first frame has moved by $\Delta X$ in the second frame as illustrated in FIG. 10 and what the brightness of the spot of light which has decreased by $\Delta I x$ from the first frame to the second frame are detected. On the other hand, in the region R2, as illustrated in FIG. 11, a spot of light which has not been detected in the first frame is detected in the second frame. In FIGS. 10 and 11, the signal data illustrated by a solid line shows signal data of the spot of light detected in the first frame, and the signal data illustrated by a dotted line indicates signal data of the spot of light detected in the second frame.

In the present embodiment, when the peak position and the brightness of the spot of light detected in the first frame change in the second frame, and when light having a peak brightness exceeding the threshold is detected in the second frame in regions in which no light has been detected in the first frame, the row direction switch control unit 41 and the column direction switch control unit 42 determine that the spot of light is detected while straddling a plurality of regions. When it is determined that the spot of light straddling a plurality of regions is detected, the row direction switch control unit 41 and the column direction switch control unit 42 change the positions of the straight lines L1 and L2. The row direction switch control unit 41 and the column direction switch control unit 42 may perform the grouping for each frame.

Next, a method of partitioning a region, that is, a method of setting the straight lines L1 and L2 by the row direction switch control unit 41 and the column direction switch control unit 42 will be described in detail.

Figure 12:
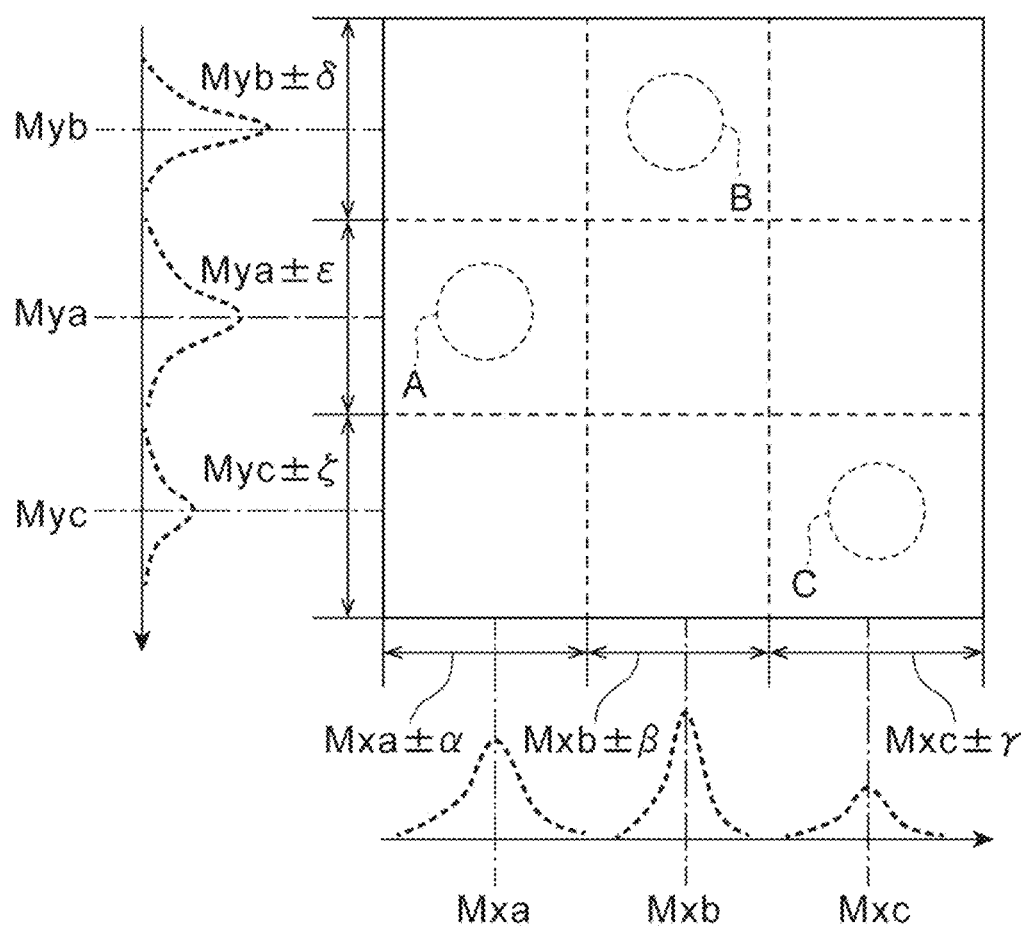
FIG. 12 is a view illustrating partitioning of regions.

When it is determined that the spot of light straddling a plurality of regions is detected, the row direction switch control unit 41 and the column direction switch control unit 42 partition the regions in which the plurality of pixels 11 are arranged based on the centroid position of the spot of light computed from the signal data described above. For example, as illustrated in FIG. 12, when centroid positions (Mxa and Mya), (Mxb and Myb), and (Mxc and Myc) are detected regarding the spots of light A, B, and C, positions at which the straight line L1 and the straight line L2 for serving as a standard of partitioning can be set are computed based on the profile width, the peak position, the brightness value, and the like in signal data of each of the spots of light A, B and C. The straight line L1 and the straight line L2 may be set at positions set in advance.

In the example illustrated in FIG. 12, positions at which the straight line L1 and the straight line L2 for serving as a standard of partitioning can be set are expressed by distances $\alpha$, $\beta$, $\gamma$, $\sigma$, $\varepsilon$, and $\zeta$ from the centroid positions of respective spots of light based on the profile width and the brightness value of signal data of each of the spots of light A, B and C. The straight lines L1 can be set at a $\pm\alpha$ position from the centroid position Mxa of the spot of light A, a $\pm\beta$ position from the centroid position Mxb of the spot of light B, and a $\pm\gamma$ position from the centroid position Mxc of the spot of light C in the row direction. The straight lines L2 can be set at a $\pm\varepsilon$ position from the centroid position Mya of the spot of light A, a $\pm\sigma$ position from the centroid position Myb of the spot of light B, and a $\pm\zeta$ position from the centroid position Myc of the spot of light C in the column direction. The distances $\alpha$, $\beta$, $\gamma$, $\sigma$, $\varepsilon$, and $\zeta$ may be values stored in a memory, a register, or the like (not illustrated) in advance or may be values based on the position at which a minimal value of a brightness distribution is detected in the entire sensor light receiving unit 10.

The centroid positions Mxa, Mxb, and Mxc of the respective spots of light A, B and C may be computed using thresholds tha, thb, and thc to respectively correspond to the peak brightness values of the respective spots of light A, B and C. For example, the centroid positions Mxa, Mxb, and Mxc of the respective spots of light A, B and C may be computed based on the pixels 11 outputting a brightness exceeding the thresholds tha, thb, and thc. At this time, computation is sequentially performed from a centroid position of a spot of light having a higher peak brightness. Information of unnecessary pixels are excluded based on the centroid positions of spots of light which have already been computed.

Figure 13:
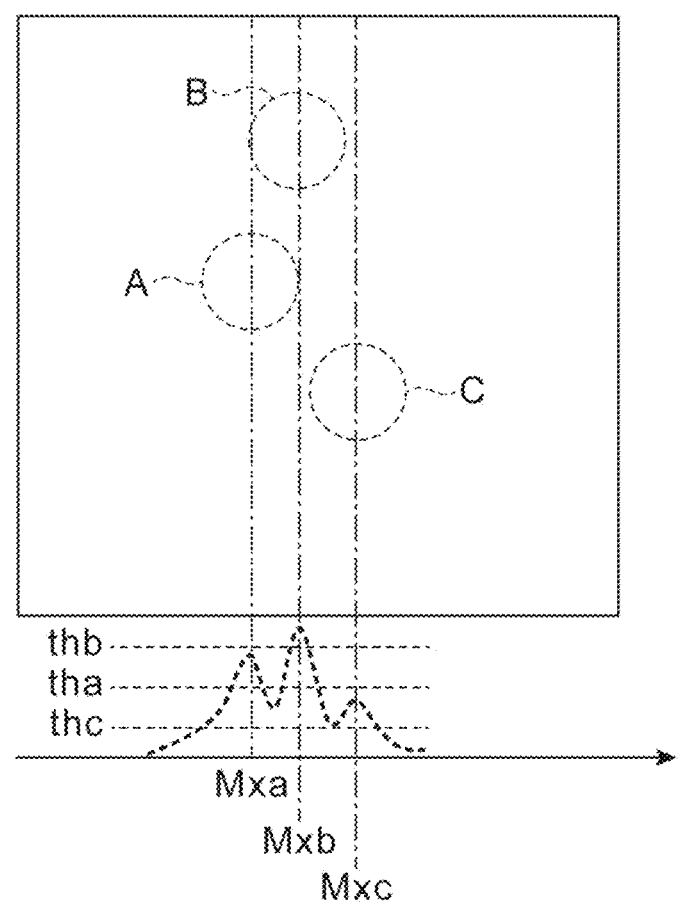
FIG. 13 is a view illustrating grouping performed by the light detection device according to the modification example of the present embodiment.

In FIG. 13, computation of the centroid positions Mxa, Mxb, and Mxc is performed using the thresholds tha, thb, and thc in a state in which the spots of light A, B and C are close to each other. Only when it is judged that the spots of light A, B and C are close to each other as illustrated in FIG. 13, computation of a centroid position using the thresholds described above may be performed. The thresholds tha, thb, and thc are values smaller than the peak brightness values of the corresponding spots of light A, B and C.

Figure 14:
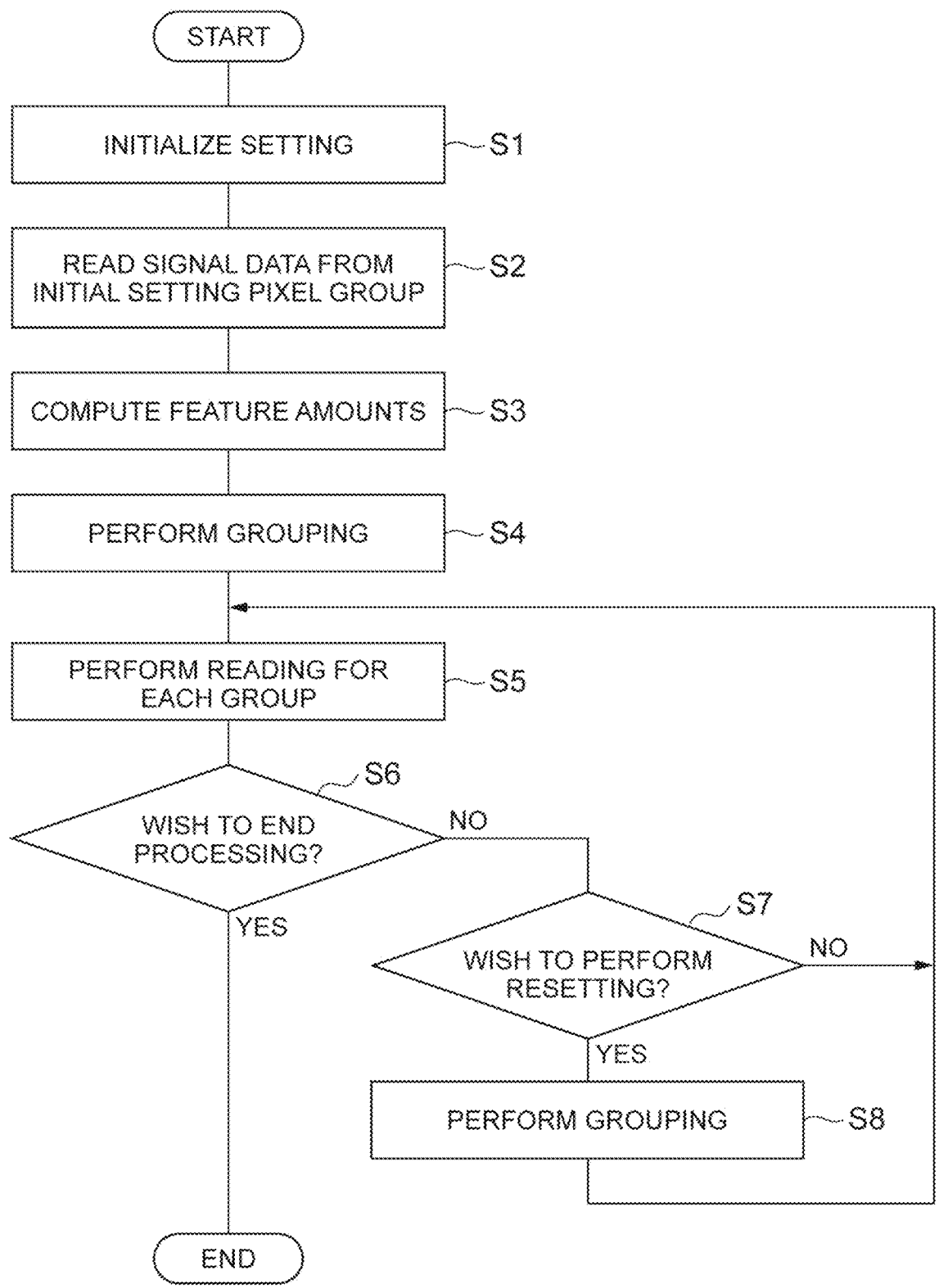
FIG. 14 is a flowchart illustrating processing performed by the light detection device.

Next, with reference to the flowchart in FIG. 14, a light detection method using the light detection device 1 will be described in detail.

First, the row direction reading units 21 and 22 and the column direction reading units 31 and 32 initialize various kinds of setting of the row direction pixel selecting unit 51, the column direction pixel selecting unit 61, the row direction skipping selecting unit 52, the column direction skipping selecting unit 62, the row direction binning reading unit 53, and the column direction binning reading unit 63. The row direction switch control unit 41 and the column direction switch control unit 42 initialize setting of grouping of the regions in which the plurality of pixels 11 are arranged (processing S1). Through the initialization, a pixel group for reading signal data in an initial frame is set to a pixel group based on information stored in advance, that is, an initial setting pixel group. In the present embodiment, the initial setting pixel group is a pixel group constituted of all the pixels 11 arranged in the sensor light receiving unit 10.

Subsequently, the row direction reading units 21 and 22 and the column direction reading units 31 and 32 read the signal data from the initial setting pixel group set in the processing S1 (processing S2). The row direction reading units 21 and 22 read the signal data projected in the row direction from a signal output through at least some of the plurality of wirings 26. The column direction reading units 31 and 32 read the signal data projected in the column direction from a signal output through at least some of the plurality of wirings 36. Due to the two pieces of signal data, a two-dimensional incident position of at least one of spots of light in the initial frame is detected.

Subsequently, the row direction reading units 21 and 22 and the column direction reading units 31 and 32 compute the feature amounts of the signal data read in the processing S2 (processing S3). For example, the feature amounts include the centroid position, the peak position, the profile width of the signal data, and the brightness.

Subsequently, the row direction switch control unit 41 and the column direction switch control unit 42 partition the regions, in which the plurality of pixels 11 are arranged, arranged in the sensor light receiving unit 10 based on the computation results computed in the processing S2 (processing S4). In other words, the row direction switch control unit 41 and the column direction switch control unit 42 divide the plurality of pixels 11 into a plurality of groups by partitioning, based on a detected two-dimensional incident position of each of the spots of light, the regions in which the plurality of pixels 11 are arranged. In the present embodiment, the row direction switch control unit 41 and the column direction switch control unit 42 perform grouping of the plurality of pixels 11 arranged in the sensor light receiving unit 10 based on the centroid position, the profile width, and the brightness computed in the processing S3. The row direction reading units 21 and 22 and the column direction reading units 31 and 32 select a pixel group for reading signal data in a subsequent frame for each group using the row direction pixel selecting unit 51 and the column direction pixel selecting unit 61.

Subsequently, the row direction reading units 21 and 22 and the column direction reading units 31 and 32 read signal data from the pixel group selected through the immediately preceding processing for each of the groups divided in the immediately preceding processing (processing S5). When a pixel column to skip is selected by the row direction skipping selecting unit 52 and the column direction skipping selecting unit 62, the row direction reading units 21 and 22 and the column direction reading units 31 and 32 skip the selected pixel column. The row direction binning reading unit 53 and the column direction binning reading unit 63 read signal data by compiling, into one signal, signals output from predetermined numbers of wirings 26 and 36 set in advance.

Subsequently, the row direction reading units 21 and 22 and the column direction reading units 31 and 32 determine whether to end the processing (processing S6). When the row direction reading units 21 and 22 and the column direction reading units 31 and 32 have determined to end the processing, the processing is ended.

When the row direction reading units 21 and 22 and the column direction reading units 31 and 32 have determined not to end the processing, the row direction switch control unit 41 and the column direction switch control unit 42 determine whether or not to change the position of dividing off a group (processing S7). When the row direction switch control unit 41 and the column direction switch control unit 42 have determined not to change the position of dividing off a group, the row direction reading units 21 and 22 and the column direction reading units 31 and 32 perform the foregoing processing S5.

When the row direction switch control unit 41 and the column direction switch control unit 42 have determined to change the position of dividing off a group, the regions, in which the plurality of pixels 11 are arranged, are partitioned based on the centroid positions of the plurality of spots of light detected in the processing S5 (processing S8). After the row direction reading units 21 and 22 and the column direction reading units 31 and 32 select a pixel group for reading signal data in a subsequent frame for each group using the row direction pixel selecting unit 51 and the column direction pixel selecting unit 61, the row direction reading units 21 and 22 and the column direction reading units 31 and 32 perform the foregoing processing S5. Through the processing described above, two-dimensional incident positions of a plurality of spots of light are repeatedly detected in a plurality of frames.

As described above, in the light detection device 1, the row switches 27 switch between electrical connection and disconnection between the photosensitive portions 15 adjacent to each other in the same row. For this reason, the photosensitive portion 15 for outputting a signal from the plurality of photosensitive portions 15 arranged in the same row to the row direction reading units 21 and 22 can be selected. The column switches 37 switch between electrical connection and disconnection between the photosensitive portions 16 adjacent to each other in the same column. For this reason, the photosensitive portion 16 for outputting a signal from the plurality of photosensitive portions 16 arranged in the same column to the column direction reading units 31 and 32 can be selected.

Figure 15:
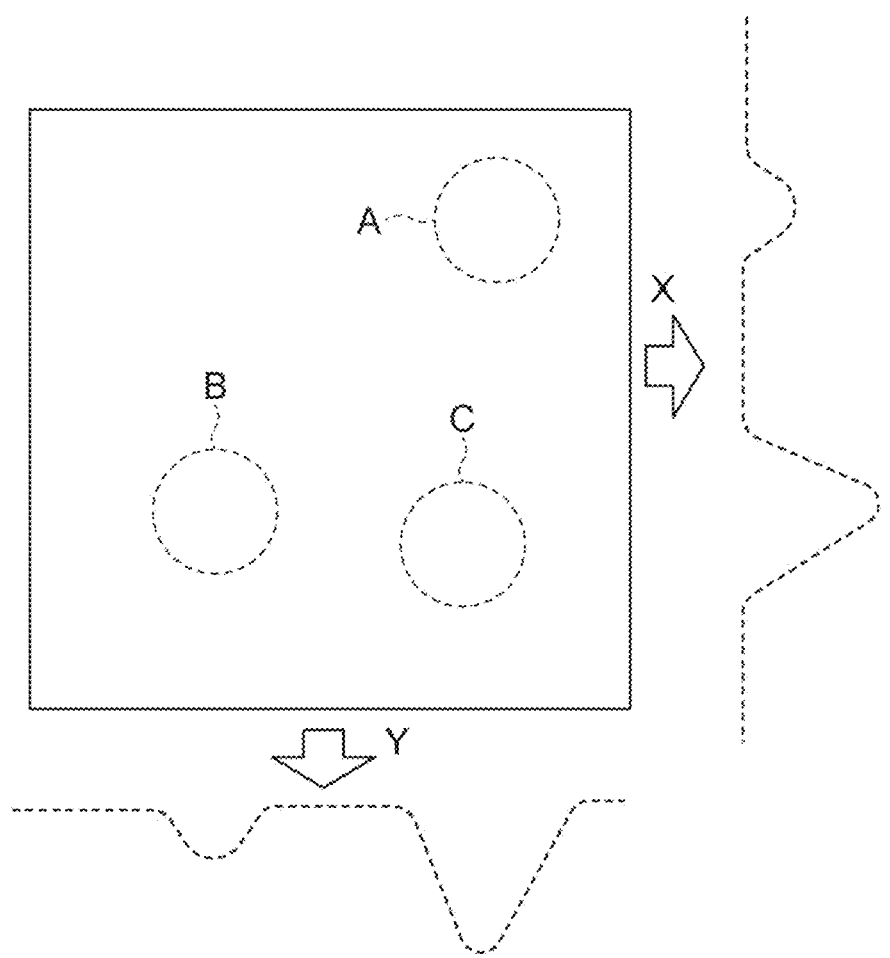
FIG. 15 is a view illustrating signal data read by a light detection device according to a comparative example.

For example, FIG. 15 illustrates a state in which signals generated due to the spots of light B and C are summed and output in the same row and signals generated due to the spots of light A and C are summed and output in the same column when the plurality of spots of light A, B and C are incident on the sensor light receiving unit 10. In this case, in projected signal data X, it is difficult to discriminate that which of the spots of light B and C has caused a signal to be generated. Similarly, in projected signal data Y, it is difficult to discriminate that which of the spots of light A and C has caused a signal to be generated. For this reason, it is difficult to accurately detect the incident position of each of the spots of light A, B and C.

Figure 16:
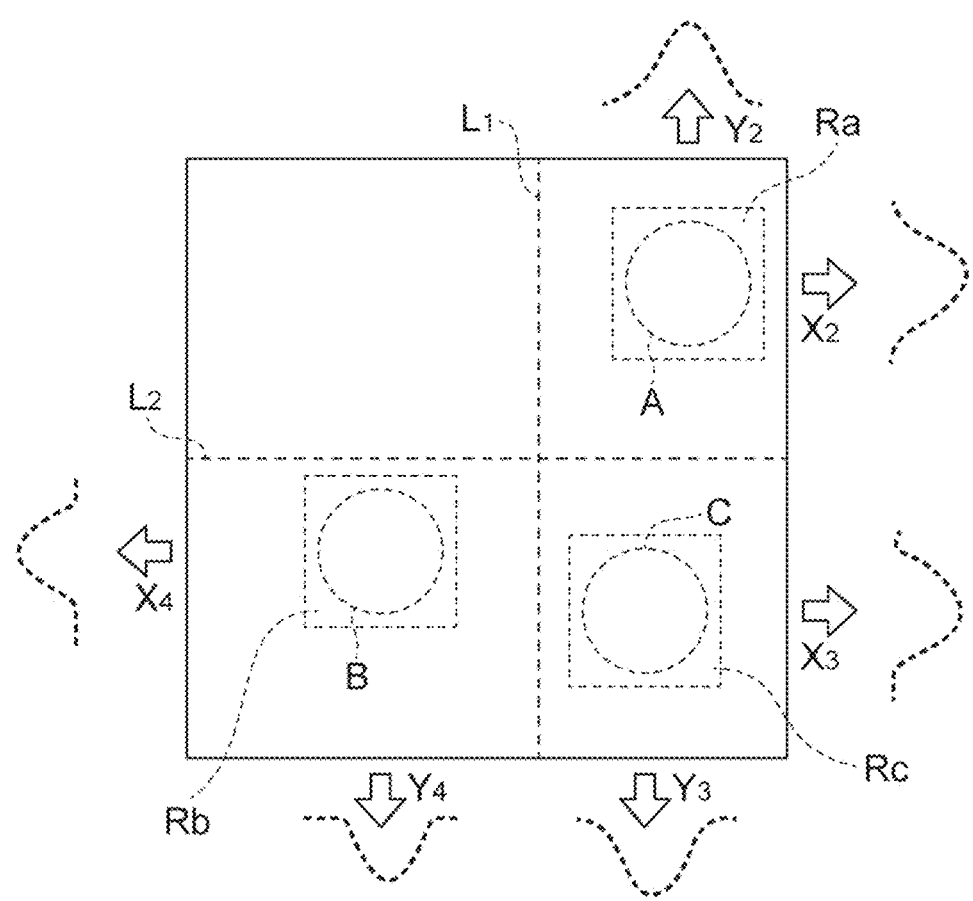
FIG. 16 is a view illustrating signal data read by the light detection device according to the present embodiment.

The light detection device 1 can prevent signals generated due to the incidence of the different spots of light B and C from being summed in the same row by cutting off electrical connection between the photosensitive portions 15 adjacent to each other in the same row using the row switches 27. The light detection device 1 can prevent signals generated due to the incidence of the different spots of light A and C from being summed in the same column by cutting off electrical connection between the photosensitive portions 16 adjacent to each other in the same column using the column switches 37. In this case, as illustrated in FIG. 16, signal data can be read for each of the spots of light A, B and C. Therefore, in a configuration in which detection speed is ensured by acquiring projected signal data, the incident positions of the plurality of spots of light can be detected accurately.

Signal data is read for each group in the same row or the same column using the row switches 27 and the column switches 37. For this reason, the number of pixels which are targets of reading in one reading is reduced. Therefore, reading speed can be improved.

The light detection device 1 further includes the row direction switch control unit 41 controlling turning ON/OFF of the row switches 27 based on the signal data read by at least one of the row direction reading units 21 and 22 and the column direction reading units 31 and 32. According to the row direction switch control unit 41, it is possible to select a photosensitive portion 15 for outputting a signal from the plurality of photosensitive portions 15 arranged in the same row to the row direction reading units 21 and 22 through the sensor circuits 23 based on the read signal data.

The light detection device 1 further includes the column direction switch control unit 42 controlling turning ON/OFF of the column switches 37 based on the signal data read by at least one of the row direction reading units 21 and 22 and the column direction reading units 31 and 32. According to the column direction switch control unit 42, it is possible to select a photosensitive portion 16 for outputting a signal from the plurality of photosensitive portions 16 arranged in the same column to the column direction reading units 31 and 32 through the sensor circuit 33 based on the read signal data.

For example, if a photosensitive portion 15 for outputting a signal to the row direction reading units 21 and 22 is selected based on the incident positions of spots of light detected in the preceding frame, incident positions of a plurality of spots of light can be detected more accurately. Similarly, if a photosensitive portion 16 for outputting a signal to the column direction reading units 31 and 32 is selected, incident positions of a plurality of spots of light can be detected more accurately.

The sensor circuit 23 has the plurality of output ports 24 and 25 for individually outputting signal data from the plurality of photosensitive portions 15 arranged in the same row. The row direction reading unit 21 reads signal data through the output port 24, and the row direction reading unit 22 reads signal data through the output port 25. The sensor circuit 33 has the plurality of output ports 34 and 35 for individually outputting signal data from the plurality of photosensitive portions 16 arranged in the same column. The column direction reading unit 31 reads signal data through the output port 34, and the column direction reading unit 32 reads signal data through the output port 35. In this manner, since signal data is read from the plurality of photosensitive portions 15 arranged in the same row or the plurality of photosensitive portions 16 arranged in the same column through the plurality of output ports 24, 25, 34, and 35, reading speed can be improved.

The sensor circuit 23 has the plurality of wirings 26 extending in the row direction and connected to the row switches 27 and the photosensitive portion 15. The sensor circuit 33 has the plurality of wirings 36 extending in the column direction and connected to the column switches 37 and the photosensitive portion 16. The row direction pixel selecting unit 51 selects a pixel group for reading signal data by selecting at least one wiring 26 for reading signal data from the plurality of wirings 26. The column direction pixel selecting unit 61 selects a pixel group for reading signal data by selecting at least one wiring 36 for reading signal data from the plurality of wirings 36.

According to this, while signals generated due to the incidence of different spots of light are prevented from being summed in the same row, signal data can be read from the photosensitive portion 15 and the photosensitive portion 16 which are more suitable for detecting incident positions of light. For example, reading speed can be further improved by further extracting the pixels 11 for reading signal data using the row direction pixel selecting unit 51 or the column direction pixel selecting unit 61 from the pixels 11 grouped by the row switches 27 and the column switches 37.

The row direction binning reading unit 53 reads signal data by compiling, into one signal, information of signals output from the plurality of photosensitive portions 15 connected to a predetermined number of wirings 26 of the plurality of wirings 26 selected by the row direction pixel selecting unit 51. The column direction binning reading unit 63 reads signal data by compiling, into one signal, information of signals output from the plurality of photosensitive portions 16 connected to a predetermined number of wirings 36 of the plurality of wirings 36 selected by the column direction pixel selecting unit 61. For this reason, while information of signals output from the plurality of photosensitive portions 15 and 16 connected to the plurality of wirings 26 and 36 is reflected, reading speed can be further improved compared with when a plurality of signals output from the plurality of photosensitive portions 15 and 16 are read as signal data without any change.

In the light detection device 1, the row direction switch control unit 41 and the column direction switch control unit 42 divide the plurality of pixels 11 into a plurality of groups by partitioning the regions in which the plurality of pixels 11 are arranged for each of the detected incident positions of the respective spots of light. The row direction reading units 21 and 22 read signal data for each of the groups divided off by the row direction switch control unit 41 and the column direction switch control unit 42. The column direction reading units 31 and 32 read signal data for each of the groups divided off by the row direction switch control unit 41 and the column direction switch control unit 42.

According to this, as illustrated in FIG. 16, even if the pixels 11 arranged in the same row are irradiated with the plurality of the spots of light B and C, signal data is read for each of the groups divided in accordance with the incident positions of the spots of light B and C. For this reason, signal data related to each of the spots of light B and C is separately read. Similarly, as illustrated in FIG. 16, even if the pixels 11 arranged in the same column are irradiated with the plurality of the spots of light A and C, signal data is read for each of the groups divided in accordance with the incident positions of the spots of light A and C. For this reason, signal data related to each of the spots of light A and C is separately read. Therefore, in a configuration in which detection speed is ensured by acquiring projected signal data, the incident positions of the plurality of spots of light can be detected accurately.

The row direction pixel selecting unit 51 and the column direction pixel selecting unit 61 select a pixel group for reading signal data from the plurality of pixels 11 within each group. For this reason, signal data can be read from a pixel group, of the plurality of pixels 11 within each group, suitable for detecting an incident position of light. For example, as illustrated in FIG. 16, signal data is read from the pixels 11 arranged in the regions Ra, Rb, and Rc which are a part within each group. Accordingly, since the number of pixels 11 for reading is reduced, reading speed can be further improved.

The row direction skipping selecting unit 52 and the column direction skipping selecting unit 62 select a pixel column to skip from a pixel group selected by the row direction pixel selecting unit 51 or the column direction pixel selecting unit 61. In this case, since the number of pixels for reading signal data from a pixel group selected by the row direction pixel selecting unit 51 and the column direction pixel selecting unit 61 is reduced, reading speed can be further improved.

The row direction binning reading unit 53 reads signal data by compiling, into one signal, information of signals output from the plurality of photosensitive portions 15 arranged in a plurality of rows within at least one group. The column direction binning reading unit 63 reads signal data by compiling, into one signal, information of signals output from the plurality of photosensitive portions 16 arranged in a plurality of rows within at least one group. For this reason, while information of signals output from the plurality of photosensitive portions 15 and 16 arranged in the plurality of rows within each group is reflected, reading speed can be further improved compared with when a plurality of signals output from the plurality of photosensitive portions 15 and 16 are read as signal data without any change.

In the light detection method according to the present embodiment, when a plurality of spots of light are detected, the plurality of pixels 11 are divided into a plurality of groups by partitioning, based on the detected two-dimensional incident position of each of the spots of light, regions in which the plurality of pixels are arranged. The signal data is read for each group. According to this, even if the pixels 11 arranged in the same row or the same column are irradiated with a plurality of spots of light, signal data related to each spot of light is individually read. Therefore, in a configuration in which detection speed is ensured by acquiring projected signal data, the incident positions of the plurality of spots of light can be detected accurately.

Hereinabove, the embodiment of the present invention and the modification examples have been described. However, the present invention is not necessarily limited to the embodiment and the modification examples described above, and various changes can be made within a range not departing from the gist thereof.

For example, in the present embodiment, the light detection device 1 includes the row direction switch control unit 41 or the column direction switch control unit 42. However, various kinds of control performed by the row direction switch control unit 41 or the column direction switch control unit 42 may be performed outside the light detection device 1. For example, switches of the plurality of row switches 27 and the plurality of column switches 37 to be turned on or turned off may be determined outside the light detection device 1. The incident position of spot of light may be computed outside the light detection device 1 based on signal data read by the row direction reading units 21 and 22 and the column direction reading units 31 and 32.

In the present embodiment, the plurality of output ports 24 and 25 for individually outputting signal data from the plurality of photosensitive portions 15 arranged in the same row are provided. The row direction reading unit 21 reads signal data through the output port 24, and the row direction reading unit 22 reads signal data through the output port 25. However, signal data may be read in a manner of being divided by time through one output port. For example, in the example illustrated in FIG. 16, the row direction reading unit 21 may read the signal data X4 after the signal data X2 and the signal data X3 are read through the output port 24.

The plurality of photosensitive portions 15 and the plurality of photosensitive portions 16 are subjected to logical sum connection to the row direction reading units 21 and 22 and the column direction reading units 31 and 32 for each of the groups divided off by the row switches 27 and the column switches 37. For this reason, when signal data is read in a manner of being divided by time for each group in the same row or the same column, reading resistance is further reduced than when being read collectively. Therefore, reading speed can be improved.

Similarly, in the example illustrated in FIG. 16, the column direction reading unit 31 may be read the signal data Y3 and the signal data Y4 after the signal data Y2 is read through the output port 34. In this case, the signal data X2, the signal data X3, and the signal data X4; and the signal data Y2, the signal data Y3, and the signal data Y4 are read in a random order.

The row direction reading unit 21 and the row direction reading unit 22 may be circuits which are disposed separately as illustrated in FIG. 1 or may be circuits which are collectively disposed in one region. Similarly, as illustrated in FIG. 1, the column direction reading unit 31 and the column direction reading unit 32 may be circuits which are disposed separately or may be circuits which are collectively disposed in one region.

All or only one of partial reading, binning reading, and skipping of a pixel column may be performed in the same frame. The light detection device 1 may have any of the row direction skipping selecting unit 52, the column direction skipping selecting unit 62, the row direction binning reading unit 53, and the column direction binning reading unit 63 or may have none.

In the present embodiment, each of the row direction switch control unit 41 and the column direction switch control unit 42 divides the plurality of photosensitive portions 15 and the plurality of photosensitive portions 16 into two groups. However, each of the row direction switch control unit 41 and the column direction switch control unit 42 may divide the plurality of photosensitive portions 15 and the plurality of photosensitive portions 16 into three or more groups. The number of groups of the plurality of photosensitive portions 15 divided off by the row direction switch control unit 41 may differ from the number of groups of the plurality of photosensitive portions 16 divided off by the column direction switch control unit 42.

REFERENCE SIGNS LIST

1 Light detection device
11 Pixel
15, 16 Photosensitive portion
21 Row direction reading unit
23, 33 Sensor circuit
24, 25 Output port
27 Row switch
31 Column direction reading unit
37 Column switch
41 Row direction switch control unit
51 Row direction pixel selecting unit
52 Row direction skipping selecting unit
53 Row direction binning reading unit
A, B, C Spot of light

The invention claimed is:

1. A light detection device detecting an incident position of light, the light detection device comprising:
 a plurality of pixels arranged two-dimensionally in a matrix and individually having a first photosensitive portion and a second photosensitive portion;
 a first circuit connecting a plurality of the first photosensitive portions to each other for every row;
 a second circuit connecting a plurality of the second photosensitive portions to each other for every column; and
 a third circuit including a first reading unit arranged to read signal data through the first circuit, a second reading unit arranged to read signal data through the second circuit, and a switch control unit,
 wherein in each row, the first circuit includes row switches arranged to switch electrical connection and disconnection between first photosensitive portions adjacent to each other in the same row, and wherein the switch control unit is arranged to control turning ON/OFF of the row switches based on signal data read by at least one of the first reading unit or the second reading unit.

2. The light detection device according to claim 1, wherein in each column, the second circuit includes column switches arranged to switch electrical connection and disconnection between second photosensitive portions adjacent to each other in the same column.

3. The light detection device according to claim 1, wherein the first circuit includes a plurality of output ports for individually outputting signal data from a plurality of the first photosensitive portions arranged in the same row, and
wherein the first reading unit is arranged to read signal data from each of the plurality of output ports.

4. The light detection device according to claim 1, wherein the first circuit includes a plurality of wirings extending in a row direction and connected to the row switches and the first photosensitive portions, and
wherein the first reading unit includes a pixel selecting unit arranged to select a pixel group for reading signal data by selecting at least one wiring for reading signal data from the plurality of wirings.

5. The light detection device according to claim 4, wherein the first reading unit includes a skipping selecting unit arranged to select a pixel column to skip from a pixel group selected by the pixel selecting unit.

6. The light detection device according to claim 4, wherein the first reading unit includes a binning reading unit arranged to read signal data by compiling, into one signal, information of signals output from a plurality of the first photosensitive portions connected to a predetermined number of wirings of the plurality of wirings selected by the pixel selecting unit.

7. A light detection device detecting incident positions of a plurality of spots of light, the light detection device comprising:
    a plurality of pixels arranged two-dimensionally in a matrix and individually having a first photosensitive portion and a second photosensitive portion;
    a first circuit connecting a plurality of the first photosensitive portions to each other for every row;
    a second circuit connecting a plurality of the second photosensitive portions to each other for every column; and
    a third circuit, the third circuit including:
        a first reading unit arranged to read signal data through the first circuit;
        a second reading unit arranged to read signal data through the second circuit; and
        a dividing unit arranged to divide the plurality of pixels into a plurality of groups corresponding to the incident positions of respective spots of light by partitioning, based on signal data read from at least one of the first reading unit or the second reading unit, regions in which the plurality of pixels are arranged,
    wherein the first reading unit is arranged to read the signal data for each of the groups divided off by the dividing unit.

8. The light detection device according to claim 7, wherein the first reading unit includes a pixel selecting unit arranged to select a pixel group for reading signal data from a plurality of the pixels within each of the groups.

9. The light detection device according to claim 8, wherein the first reading unit includes a skipping selecting unit arranged to select a pixel column to skip from a pixel group selected by the pixel selecting unit.

10. The light detection device according to claim 7, wherein the first reading unit includes a binning reading unit arranged to read signal data by compiling, into one signal, information of signals output from a plurality of the first photosensitive portions arranged in a plurality of rows within at least one group.

11. A light detection method comprising:
using a light detection device provided with a plurality of pixels arranged two-dimensionally in a matrix and individually including a first photosensitive portion and a second photosensitive portion, a first circuit connecting a plurality of the first photosensitive portions to each other for every row, and a second circuit connecting a plurality of the second photosensitive portions to each other for every column;
reading signal data projected in a row direction from signals output through the first circuit;
reading signal data projected in a column direction from signals output through the second circuit;
detecting a two-dimensional incident position of at least one of spots of light based on two pieces of the read signal data;
when a plurality of spots of light are detected, dividing the plurality of pixels into a plurality of groups by partitioning, based on a detected two-dimensional incident position of each of the spots of light, regions in which the plurality of pixels are arranged; and
reading the signal data for each group.

* * * * *